United States Patent
Dede

(10) Patent No.: US 11,673,110 B2
(45) Date of Patent: Jun. 13, 2023

(54) METHOD OF FABRICATING A RADIATIVE AND CONDUCTIVE THERMAL METAMATERIAL COMPOSITE

(71) Applicant: Toyota Motor Engineering and Manufacturing North America, Inc., Plano, TX (US)

(72) Inventor: Ercan M. Dede, Ann Arbor, MI (US)

(73) Assignee: Toyota Motor Engineering and Manufacturing North America, Inc., Plano, TX (US)

( * ) Notice: Subject to any disclaimer, the term of this patent is extended or adjusted under 35 U.S.C. 154(b) by 341 days.

(21) Appl. No.: 17/025,193

(22) Filed: Sep. 18, 2020

(65) Prior Publication Data

US 2021/0283569 A1    Sep. 16, 2021

Related U.S. Application Data

(63) Continuation-in-part of application No. 16/815,819, filed on Mar. 11, 2020.

(51) Int. Cl.
*G02B 1/00* (2006.01)
*B01J 19/12* (2006.01)
(Continued)

(52) U.S. Cl.
CPC .............. *B01J 19/12* (2013.01); *G02B 1/002* (2013.01); *H05B 3/009* (2013.01); *H05B 3/12* (2013.01); *H05B 3/48* (2013.01)

(58) Field of Classification Search
CPC ....... G02B 1/002; G02F 2202/30; F28F 13/18
See application file for complete search history.

(56) References Cited

U.S. PATENT DOCUMENTS

| | | |
|---|---|---|
| 2019/0246457 A1 | 8/2019 | Aoki et al. |
| 2020/0122112 A1 | 4/2020 | Aoki |
| 2021/0184065 A1* | 6/2021 | Banadaki ................ G02F 1/025 |

FOREIGN PATENT DOCUMENTS

| | | |
|---|---|---|
| CN | 107610687 A | 1/2018 |
| CN | 108847210 A | 11/2018 |

(Continued)

OTHER PUBLICATIONS

Dede et al., "Thermal Metamaterials for Radiative Plus Conductive Heat Flow Control," Applied Physics Letters, May 11, 2020, 6 pages.

*Primary Examiner* — Eric S Ruppert
(74) *Attorney, Agent, or Firm* — Jordan IP Law, LLC

(57) ABSTRACT

A method of fabricating a multi-mode heat transfer device includes forming a thermal metamaterial composite structure that includes an inner core to radiate heat and an outer core that at least partially surrounds the inner core. The outer core includes a high thermally conductive material inlay and a low thermally conductive material matrix that form a composite material pattern to thermally concentrate and direct heat radiated by the inner core to an area outside of the multi-mode heat transfer device, while also thermally cloaking heat radiated by the inner core. A plurality of thermal metamaterial composite structures are then stacked in a stacked formation to form a thermal metamaterial composite assembly. The method includes manipulating the emissivity of the thermal metamaterial composite assembly by selectively applying a coating or a plating to one or more outer surface regions of the outer core to enhance the transfer of heat by the composite material pattern.

20 Claims, 10 Drawing Sheets

(51) Int. Cl.
*H05B 3/48* (2006.01)
*H05B 3/00* (2006.01)
*H05B 3/12* (2006.01)

(56) References Cited

FOREIGN PATENT DOCUMENTS

| | | |
|---|---|---|
| CN | 105845121 B | 12/2019 |
| CN | 107555940 B | 3/2020 |
| KR | 102066988 B1 | 1/2020 |

\* cited by examiner

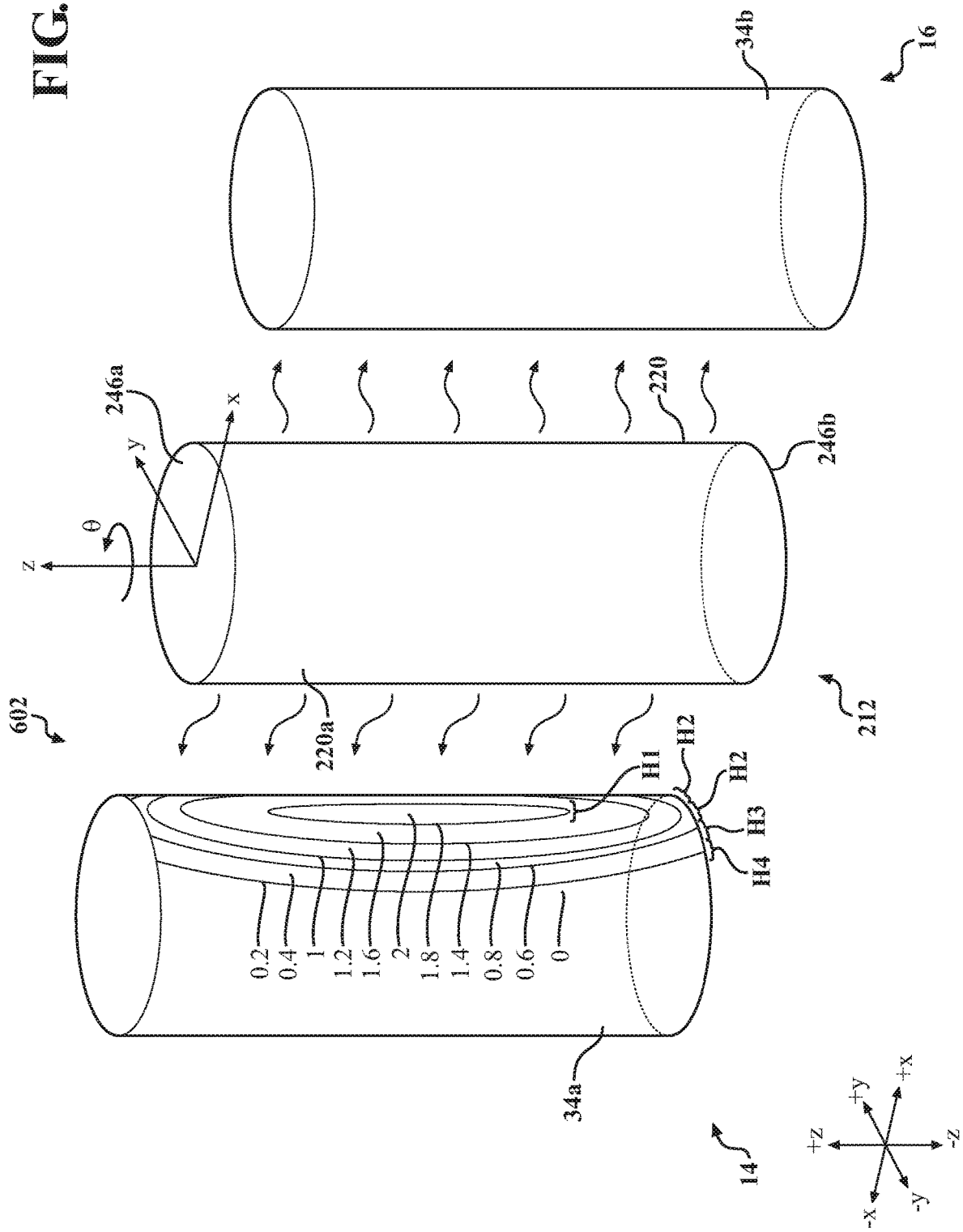

METHOD OF FABRICATING A RADIATIVE AND CONDUCTIVE THERMAL METAMATERIAL COMPOSITE

CROSS-REFERENCE TO RELATED APPLICATIONS

The present application is a continuation-in-part of U.S. patent application Ser. No. 16/815,819 (filed Mar. 11, 2020), which is hereby incorporated by reference in its complete entirety.

TECHNICAL FIELD

Embodiments relate generally to a method of fabricating a heat transfer systems that is configured to direct radiated heat from one object to another object. More particularly, embodiments relate to a method of fabricating a thermal composite metamaterial emitter that includes a high thermally conductive inlay and a low thermally conductive matrix that for conduction and radiation.

BACKGROUND

Heat transfer systems generally use heat conduction and/or heat radiation principles. In these systems, heat is transferred via conduction and/or radiation amongst objects near a heat source. Most commonly, heat receiving structures are positioned to surround the heat source. As such, as heat is emitted from the heat source, each of the heat receiving structures receive a portion of the heat emitted from the heat source. This is inefficient and does not direct the heat to a specific heat receiving structure.

SUMMARY

In one embodiment, a multi-mode heat transfer system is provided. The heat transfer system includes an emitter device. The emitter device includes an inner core surrounded by an outer core having a thickness and an outer surface. A composite material pattern extends through at least a portion of the outer surface and at least a portion of the thickness of the outer core and is thermally coupled to the inner core. The composite material pattern directs a heat from the inner core to an object other than the emitter device.

In another embodiment, a power transfer system is provided. The power transfer system includes an emitter device and a receiver device. The emitter device includes an inner core and an outer core having a thickness that circumferentially surrounds the inner core and a composite material pattern. The outer core having materials that includes at least one high thermal conductivity material inlay and a low thermal conductivity material matrix. The composite material pattern is formed by the materials. The composite material pattern extends a length of the emitter device in a system vertical direction and is positioned within a portion of the thickness of the outer core. The emitter device is positioned spaced apart from the receiver device. The composite material pattern directs a power from the emitter device to the receiver device.

In yet another embodiment, a multi-mode heat transfer system is provided. The heat transfer system includes an emitter device and a receiver device. The emitter device includes an inner core and an outer core having a thickness that circumferentially surrounds the inner core, and a composite material pattern. The outer core having materials that alternate between a high thermal conductivity material inlay and a low thermal conductivity material matrix. The composite material pattern is formed within the alternating materials. The composite material pattern extends a length of an outer surface of outer core in a system vertical direction and is positioned within a portion of the thickness of the outer core. The composite material pattern includes a tear drop region that surrounds the inner core, a flux field region surrounds at least a portion of the tear drop region, a plurality of curved segments that surround the inner core and are positioned within and outside of the tear drop region, and a plurality of partial ellipses segments are positioned within the tear drop region. The composite material pattern further includes a plurality of curvilinear segments and a plurality of non-linear segments positioned within the flux field region but not within the tear drop region. The emitter device is positioned spaced apart from the receiver device. The composite material pattern is directed to the receiver device and directs a heat from the emitter device to the receiver device.

One or more methods of fabricating a multi-mode heat transfer device, such as an emitter device in accordance with embodiments, is also provided herein.

These and additional features provided by the embodiments described herein will be more fully understood in view of the following detailed description, in conjunction with the drawings.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A schematically depicts a perspective and side view of the heat transfer system of FIG. 1 with one of the pair of receiver devices receiving a heat flux transmitted from the emitter device while the other receiver device receiving substantially less of the heat flux transmitted from the emitter device, according to one or more embodiments shown and described herein;

DETAILED DESCRIPTION

Figure 1A:
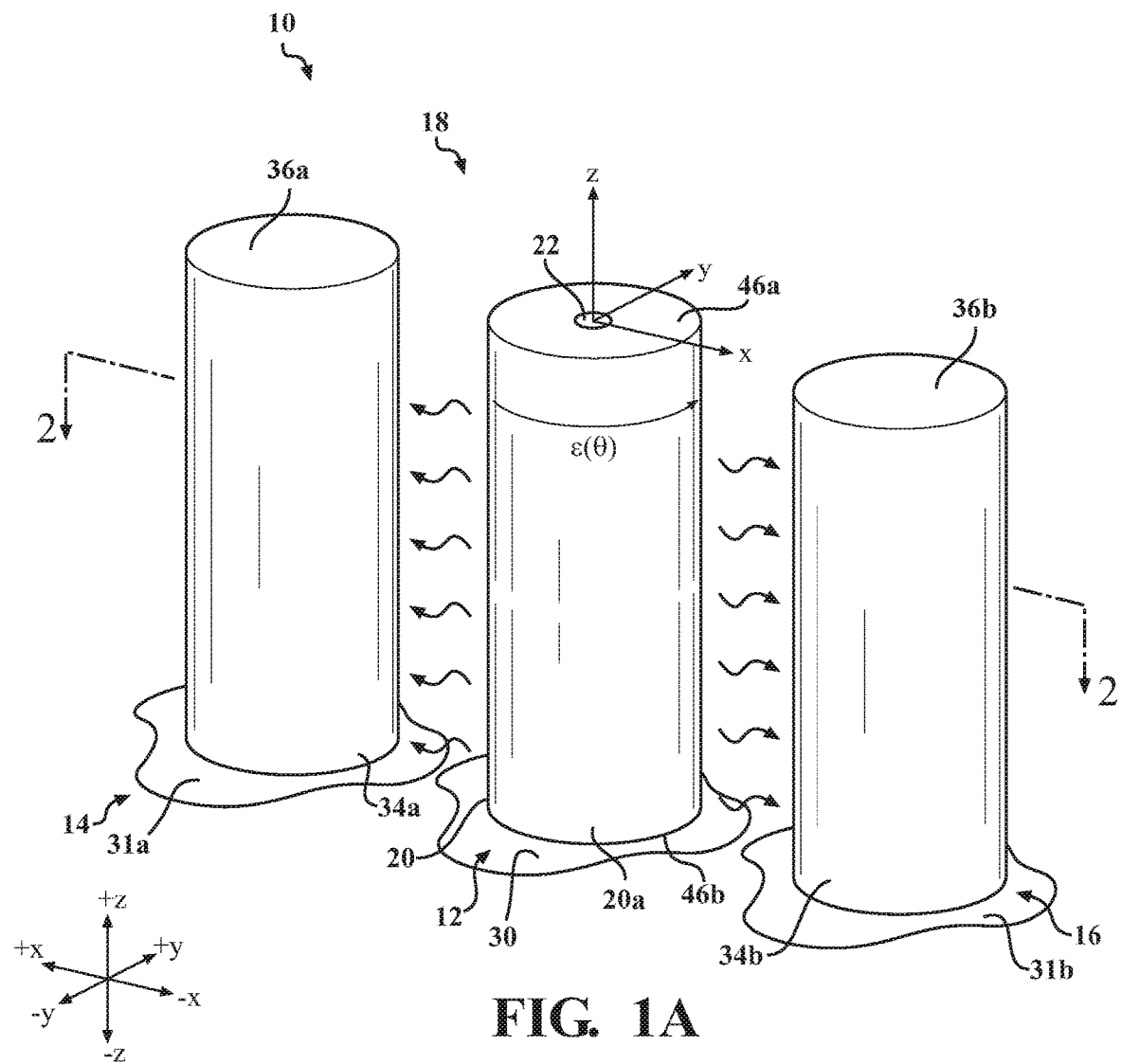
FIG. 1A schematically depicts a perspective and side view of a heat transfer system that includes an emitter device positioned between a pair of spaced apart receiver devices, according to one or more embodiments shown and described herein.

Embodiments described herein generally relate to a multi-mode (i.e., radiation and conduction) heat transfer system. In some embodiments, the multi-mode heat transfer system is used in thermal protection systems. In other embodiments, the multi-mode heat transfer system is used in high temperature thermal energy harvesting and the like. The multi-mode heat transfer system includes an emitter device and at least one spaced apart receiving device. The emitter device is positioned to selectively transmit a heat and/or power in the far field towards a colder body receiver, such as the at least one spaced apart receiving device. As such, the multi-mode heat transfer system takes a heat from the emitter device and directs the heat to an area where the heat may be beneficial and/or may not cause harm. For example, a heat generated by a hot body engine may be directed, by the emitter device, to the receiving device positioned in an engine compartment area that has ample intake of air to cool the heat. In another example, a heat generated by a component in an aerospace application, such as a hot body solar receiver, may be directed, by the emitter device, to another receiving device, such as a sail that is coupled to another component (e.g., a fly-by-light sailcraft) that requires, or works more efficient, when receiving heat and associated directed radiated power.

The emitter device may be generally cylindrical in shape with an outer core that has a thickness and circumferentially surrounds an inner core. It should be understood that the emitter device may be other shapes including rectangular, square, hexagonal, non-regular geometries, and the like. In some embodiments, the outer core may be formed from a plurality of annular rings that include alternating materials between a high thermal conductivity material inlay and a low thermal conductivity material matrix, such as carbon aerogel or polydimethylsiloxane (PDMS) material that circumferentially surrounds the inner core. In other embodiments, the outer core may be formed from three-dimensional printing alternating between the high thermal conductivity material inlays and the low thermal conductivity material matrix that circumferentially surround the inner core. That is, an anisotropic thermal conductivity of the outer core and its surface emissivity of the outer surface is optimized to direct heat from the emitter device to the at least one receiver. A focused radiation is attained by optimizing the layout of the high thermal conductivity material inlays and the low thermal conductivity material matrix plus angularly varying the emissivity surface profile.

A composite material pattern extends a length of the emitter device in a system vertical direction and extends through at least a portion of the outer surface and the thickness of the outer core. The composite material pattern is thermally coupled to the inner core of the emitter device. Further, the composite material pattern directs the heat from the inner core to the receiver device without directing heat, or significantly less heat, to other objects such as a second receiver device.

As used herein, the term "system longitudinal direction" refers to the forward-rearward direction of the system (i.e., in the +/−X-direction depicted in FIG. 1). The term "system lateral direction" refers to the cross-system direction (i.e., in the +/−Y-direction depicted in FIG. 1), and is transverse to the longitudinal direction. The term "system vertical direction" refers to the upward-downward direction of the system (i.e., in the +/−Z-direction depicted in FIG. 1).

Figure 1B:
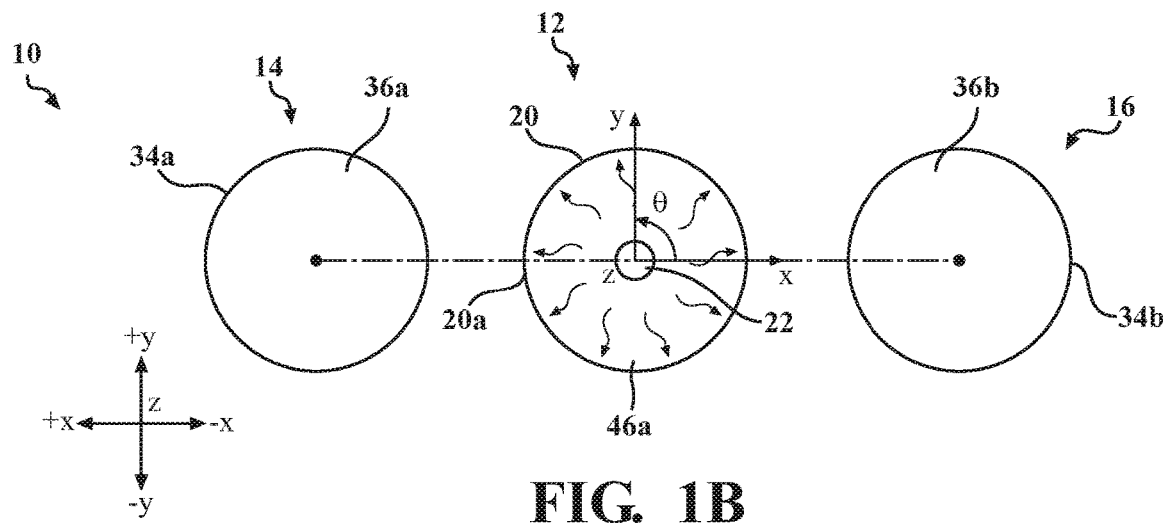
FIG. 1B schematically depicts a top down view of the heat transfer system of FIG. 1A, according to one or more embodiments shown and described herein.

Now referring to FIGS. 1A-1B, a multi-mode heat transfer system 10 is provided. In some embodiments, the multi-mode heat transfer system 10 includes an emitter device 12 and a first receiver device 14. In an experimental setup for modeling purposes, the multi-mode heat transfer system 10 also includes a second receiver device 16. The first and second receiver devices 14, 16 are spaced apart defining a gap 18. The emitter device 12 is positioned in the gap 18 between the first and second receiver devices 14, 16. In some embodiments, the emitter device 12 is linearly or centrally placed or aligned with the first and second receiving devices 14, 16. That is, in some embodiments, the first receiver device 14 is positioned where θ=180 degrees and the second receiver device 16 is positioned where θ=0 degrees and the emitter device 12 is positioned therebetween. It should be appreciated that, in some embodiments, the second receiver 16, in this arrangement, is thermally isolated at θ=0 degrees.

In some embodiments, each of the receiver devices 14, 16 are generally cylindrical in shape with an outer surface 34a, 34b respectively. In some embodiments, the cylindrical shape is formed from a solid conductive material 36a, 36b. In other embodiments the cylindrical shape is formed from a plurality of layers. As such, the outer surface 34a, 34b of each of the receiver devices 14, 16 is generally a solid surface. In some embodiments, the solid conductive material 36a, 36b is copper. In other embodiments, the solid conductive material 36a, 36b is titanium, aluminum, silver, gold, silicon, graphite composite, and the like. In other embodiments, each of the receiver devices 14, 16 is a square shape, a flat shape, a rectangular shape, a hexagonal shape, an octagonal shape, and the like. Further, in other embodiments, the shape of each of the receiver devices 14, 16 is an irregular shape.

In some embodiments, each of the receiver devices 14, 16 are equally spaced from the emitter device 12. In a non-limiting example, each of the receiver devices 14, 16 are spaced apart 350 millimeters from the emitter device 12. It should be understood that each of the receiver devices 14, 16 may be spaced apart greater than 350 millimeter distance and/or less than the 350 millimeters distance. Further, in some embodiments, the receiver devices 14, 16 may be offset in unequal distances from the emitter device 12. For example, the first receiver device 14 may be positioned 350 millimeters from the emitter device 12 and the second receiver device 16 may be positioned 300 millimeters from the emitter device.

It should be appreciated that each of the receiver devices 14, 16 may extend 500 millimeters in the system vertical direction (i.e., in the +/−Z direction) from a coupling component 31a, 31b (i.e. a cooling structure, another device that can take on the heat from the emitter device 12, and the like). It should be appreciated that this is a non-limiting example and each of the receiver devices 14, 16 may extend more than or less than 500 millimeters. It should also be appreciated that each of the receiver devices 14, 16 may extend at different heights than the emitter device 12, at different heights than the other one of the receiver devices 14, 16, and the like. Further, in some embodiments, the distance between the receiver devices 14, 16 that define the gap 18 and/or the distance between each of the receiver devices 14, 16 and the emitter device 12 may be a ratio based on the height that the emitter device 12 extends in the system vertical direction (i.e., in the +/−Z direction) from a heated coupling component 30, as discussed in greater detail herein. Further, in some embodiments, each of the receiver devices 14, 16 may have a diameter of 200 millimeters. It should be appreciated that in some embodiments, the first receiver device 14 may have a greater diameter than the second receiver device 16, and vice versa. Further, in some embodiments, each of the receiver devices 14, 16 may have an equal diameter that is greater than and/or less than 200 millimeters.

Figure 2A:
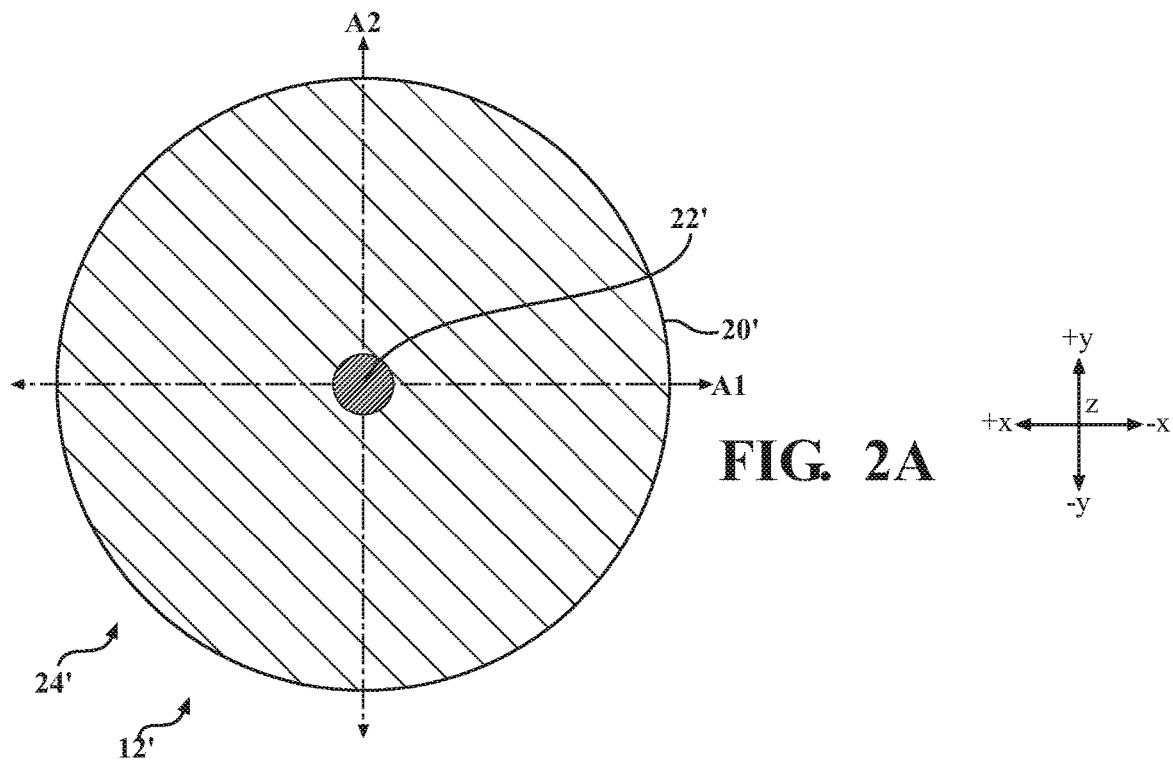
FIG. 2A schematically depicts a cross-sectional view of a solid emitter device of the heat transfer system of FIG. 1A taken from line 2-2, according to one or more embodiments shown and described herein.

Now referring to FIGS. 1A-1B and 2A-2D, in some embodiments, the emitter device 12 is generally cylindrical in shape having an inner core 22 circumferentially surrounded by an outer core 24 that includes a thickness and an outer surface 20. The outer surface may further include a surface coating or paint layer 20a. That is, in some embodiments, the outer surface coating or paint layer 20a is engineered to cover a portion or the entire outer surface 20 of the emitter device 12, as discussed in greater detail herein. In some embodiments, the outer core 24 is formed from a plurality of annular rings (FIG. 3). The outer core 24 may be formed by high thermal conductivity material inlays 26a and a low thermal conductivity material matrix, 26b, such as a carbon aerogel, and the like, which forms an anisotropic thermal conductivity within the outer core 24, as discussed in greater detail herein. Further, the high thermal conductivity material inlays 26a and the low thermal conductivity material matrix 26b may be optimized to form a composite material pattern 28, as discussed in greater detail herein. In some embodiments, the high thermal conductivity material inlays 26a and the low thermal conductivity material matrix 26b may alternate. In other embodiments, the high thermal conductivity material inlays 26a and the low thermal conductivity material matrix 26b do not alternate or are arranged in some other pattern or shape. In some embodiments, the high thermal conductivity material inlays 26a is copper. In other embodiments, the high thermal conductivity material inlays 26a may be titanium, aluminum, silver, gold, graphite composite, and the like. The high thermal conductivity material inlays 26a and the low thermal conductivity material matrix 26b may extended radially from the inner core 22, may together form the outer core 24 that circumferentially surrounds the inner core 22, and the like.

In other embodiments, the emitter device 12 is a square shape, a rectangular shape, a hexagonal shape, an octagonal shape, other uniform and non-uniform geometric shapes, and the like. Further, in other embodiments, the shape of the emitter device 12 is an irregular shape. Further, in some embodiments, regardless of the shape, the high thermal conductivity material inlays 26a and the low thermal conductivity material matrix 26b may extend radially from and/or may circumferentially surround the inner core 22 such that the inner core 22 may be positioned to extend in the system vertical direction (i.e., in the +/−Z direction) within the shape of the emitter device 12. In some embodiments, the inner core 22 is centrally positioned with respect to the outer surface 20 of the emitter device 12. In other embodiments, the inner core 22 is positioned offset to the center with respect to the outer surface 20 of the emitter device 12.

In some embodiments, the inner core 22 is a high thermal conductivity material. For instance, the inner core 22 may be a copper material. In other embodiments, the inner core 22 may be a diamond material, a silver material, a gold material, an aluminum nitride material, a silicon carbide material, an aluminum material, a tungsten material, a graphite material, a zinc material, a combination thereof, and the like. Further, in some embodiments, the inner core 22 is an embedded heat source such as a cartridge heater. In this embodiment, the inner core 22 may be tubular and configured to receive a heat from another component, such as an engine, a semiconductor device, and the like. In some embodiments, the diameter of the inner core 22 is 20 millimeters. In other embodiments, the diameter of the inner core 22 is greater than and/or less than 20 millimeters. The inner core 22 is thermally coupled to the composite material pattern 28 such that the heat from the inner core 22 is directed to the first receiver device 14 via the composite material pattern 28, as discussed in greater detail herein. For example, in experimentation, the inner core 22 was a 100 W heat source.

Still referring to FIGS. 1A-1B and 2A-2D, in some embodiments, the emitter device 12 may have a diameter of 200 millimeters. It should be appreciated that in some embodiments, the diameter of the emitter device 12 may be more or less than 200 millimeters. Further, it should be appreciated that in some embodiments, the emitter device 12 may have a greater diameter than the receiver devices 14, 16 and vice versa. In some embodiments, each of the receiver devices 14, 16 may have an equal diameter to the emitter device 12 and the diameter may be greater than and/or less than 200 millimeters.

The emitter device 12 may extend in the system vertical direction (i.e., in the +/−Z direction) from the heated coupling component 30 (i.e., an engine, a semiconductor device, and the like) and each of the receiver devices 14, 16 may extend 500 millimeters in the system vertical direction (i.e., in the +/−Z direction) from the coupling component 31a, 31b, as shown in FIG. 1A. It should be appreciated that the 500 millimeters is non-limiting as the emitter device 12 may extend in the system vertical direction (i.e., in the +/−Z direction) from the heated coupling component 30 more or less than 500 millimeters. It should also be understood that a height of the inner core 22 may change based on the height of the emitter device 12. It should be understood that, in some embodiments, the heated coupling component 30 is only thermally coupled to the inner core 22 and is thermally isolated from all other parts of the emitter device 12.

Further, in some embodiments, the emitter device 12 and one or both of the pair of receiver devices 14, 16 may extend in the system vertical direction (i.e., in the +/−Z direction) from the heated coupling component 30. In other embodiments, the emitter device 12 and one or both of the pair of receiver devices 14, 16 may extend in the system vertical direction (i.e., in the +/−Z direction) from either or both of the coupling components 31a, 31b. In other embodiments, it is understood that the emitter device 12 and one or both of the pair of receiver devices 14, 16 may extend in other directions besides in the vertical direction from the heated coupling component 30, from either or both of the coupling component 31a, 31b, and the like. For instance, the emitter device 12 and one or both of the pair of receiver devices 14, 16 may extend in a lateral direction (i.e., in the +/−Y direction) in the longitudinal direction (i.e., in the +/−X direction) and a combination thereof from the heated coupling component 30, from either or both of the coupling component 31a, 31b, and the like. As such, it should be appreciated that there may be a plurality of spatial relationships between the receiver devices 14, 16 and the emitter device 12.

Now referring to FIGS. 2A-2D, in some embodiments, a plurality of various emitter designs are conceivable. In some embodiments, the various emitter designs include a baseline case in which the emitter body is either all copper or all carbon aerogel, as shown in the emitter device 12' of FIG. 2A. It is understood that the emitter device 12' is identical to the emitter device 12 with the exceptions of the features described herein. As such, like features will use the same reference numerals with a suffix "'" for the reference numbers. As such, for brevity reasons, these features will not be described again. It should be understood that the emitter device 12' is generally cylindrical in shape having an inner core 22' circumferentially surrounded by an outer core 24' that includes a thickness and an outer surface 20'. The outer core 24' is a solid body construction.

Referring to FIGS. 1A-1B, 2B-2D and 3, in some embodiments, a portion of the outer surface 20 includes the composite material pattern 28. The composite material pattern 28 may extend a length of the emitter device 12 in a system vertical direction (i.e., in the +/−Z direction). In some embodiments, the composite material pattern 28 is thermally coupled to the inner core 22 of the emitter device 12. Further, the composite material pattern 28 may be configured to direct the heat from the inner core 22 to the first receiver device 14 without directing heat, or significantly less heat, to the second receiver device 16. That is, the composite material pattern 28 is configured to direct heat as radiated heat from the inner core 22 to the first receiver device 14 and not to the second receiver device 16.

In some embodiments, the first receiver device 14 is positioned in an area that is configured to receive heat. For example, in aerospace applications, one component, such as a sail may be coupled to another component (e.g., a fly-by-light sailcraft) that may need, or works more efficient, when receiving additional heat and associated directed radiated power. As such, the one component may be coupled to the first receiver device 14 such that the emitter device 12 may direct radiated heat to the first receiver device 14 in order to provide heat to the coupled component. In another example, a heat generated from a hot body engine may be captured by the inner core 22 and then transferred to the first receiver device 14 such that unwanted heat from the hot body engine may be transferred to another area within the vehicle. In other embodiments, the heat radiated by the emitter device 12 is forced into ambient air. For example, heat from the engine hot body may be directed, by the composite material pattern 28 of the emitter device 12, to an object positioned in an area of an engine compartment in which air is directed out of the engine compartment.

The composite material pattern 28 may be a plurality of shapes. As such, it should be appreciated that the composite material pattern 28 may be optimized for each specific application. In some embodiments, the composite material pattern 28 includes a plurality of uniform shapes. In other embodiments, the composite material pattern 28 includes irregular shapes. In other embodiments, the composite material pattern 28 includes both uniform and irregular shapes.

Now referring to FIG. 2B, a first aspect of a composite material pattern 28 of the emitter device 12 will be described in greater detail. In this aspect, the composite material pattern 28 may include a circular portion 52 that surrounds the inner core 22. The composite material pattern 28 may further include a plurality of segments 54 that extend radially outward from half of the circular portion 52 such that the composite material pattern 28 is a semi-circular arrangement 55 that transverses the outer core 24 (i.e., extends a length of the outer surface 20 of the outer core 24 of the emitter device 12 in the system vertical direction (i.e., in the +/−Z direction)). As such, two of the plurality of segments 54 may extend about the axis A2 to form the ending/starting position of the composite material pattern 28. In this embodiment, a plurality of outer curved segments 56 form the outer portion 50 of the emitter device 12 by surrounding the remaining portions of the inner core 22. In some embodiments, at least a portion of the plurality of outer curved segments 56 are transverse to the composite material pattern 28. That is, two of the plurality of segments 54 may extend at 90 degrees and 270 degrees such that the two segments of the plurality of segments 54 intersect with a portion of the plurality of outer curved segments 56.

It should be appreciated, that in some embodiments, the composite material pattern 28 spans θ=−90° to θ=90° nearest to the second receiver device 16 with the composite material pattern 28 focusing the high thermal conductivity material inlays 26a directed towards the first receiver device 14. In some embodiments, the high thermal conductivity material inlays 26a are 2 millimeters thick at a 3 millimeter spacing in the composite material pattern 28. It should be understood that the high thermal conductivity material inlays 26a may be less than or more than 2 millimeters thick at less than or more than 3 millimeter spacing in the composite material pattern 128.

Figure 2C:
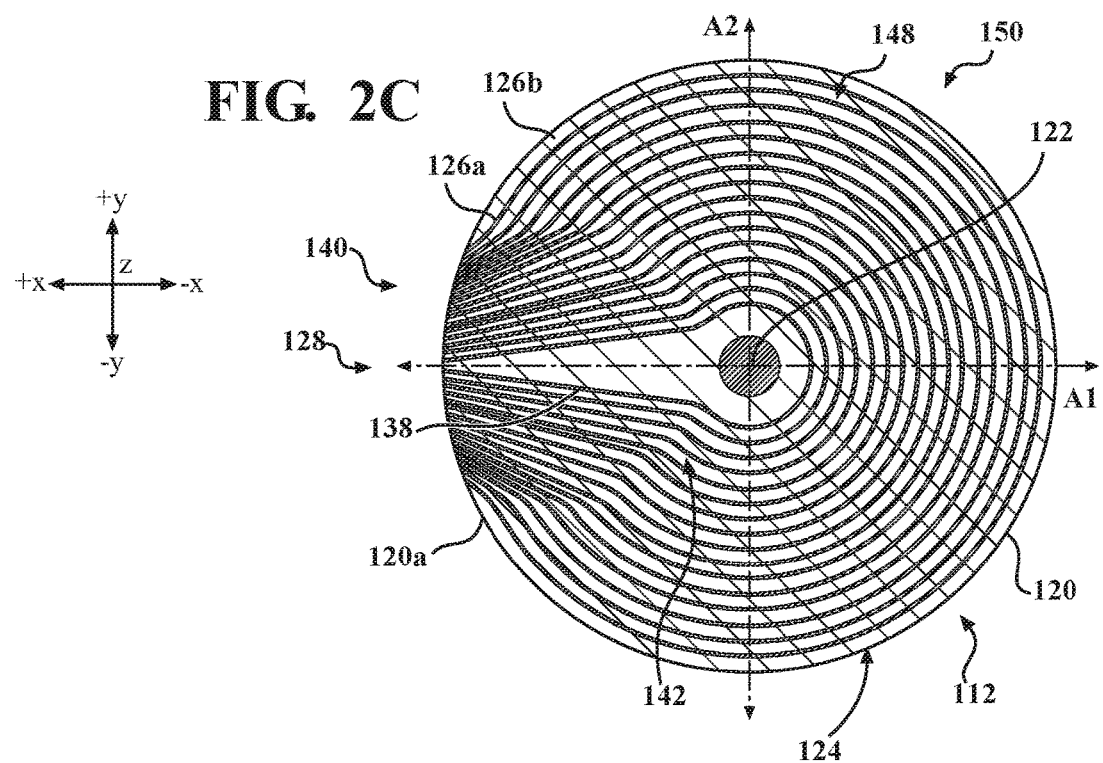
FIG. 2C schematically depicts a cross-sectional view of a second aspect of a composite material pattern of the emitter device of the heat transfer system of FIG. 1A taken from line 2-2, according to one or more embodiments shown and described herein.
Figure 2B:
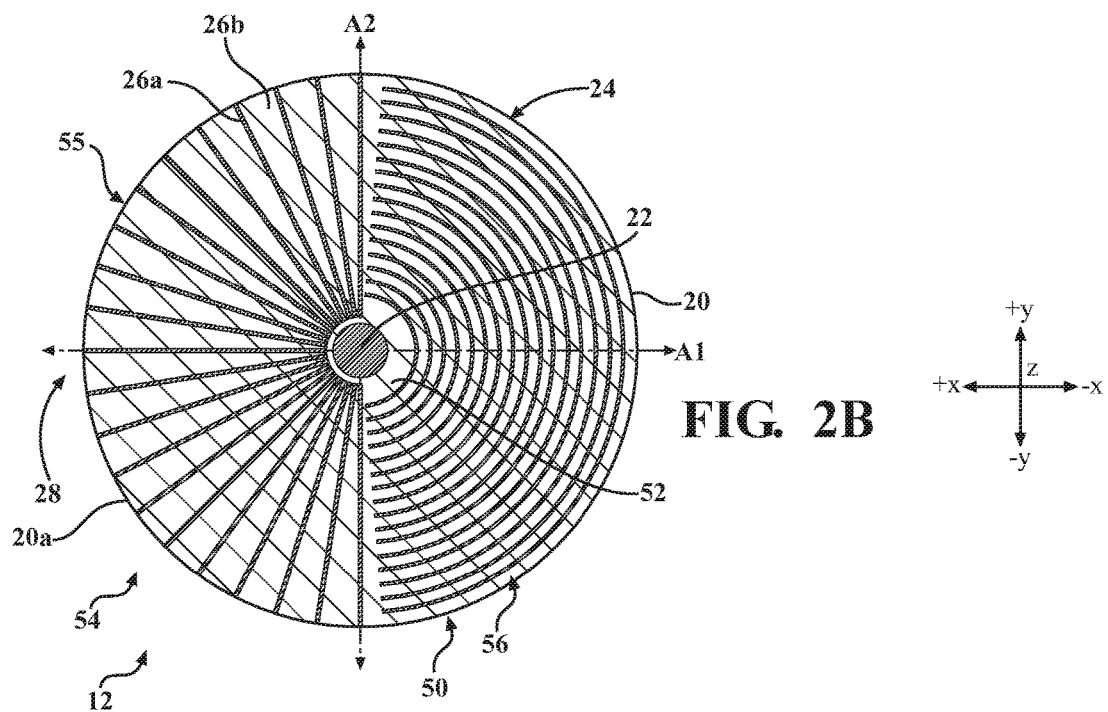
FIG. 2B schematically depicts a cross-sectional view of a first aspect of a composite material pattern of the emitter device of the heat transfer system of FIG. 1A taken from line 2-2, according to one or more embodiments shown and described herein.
Figure 3:
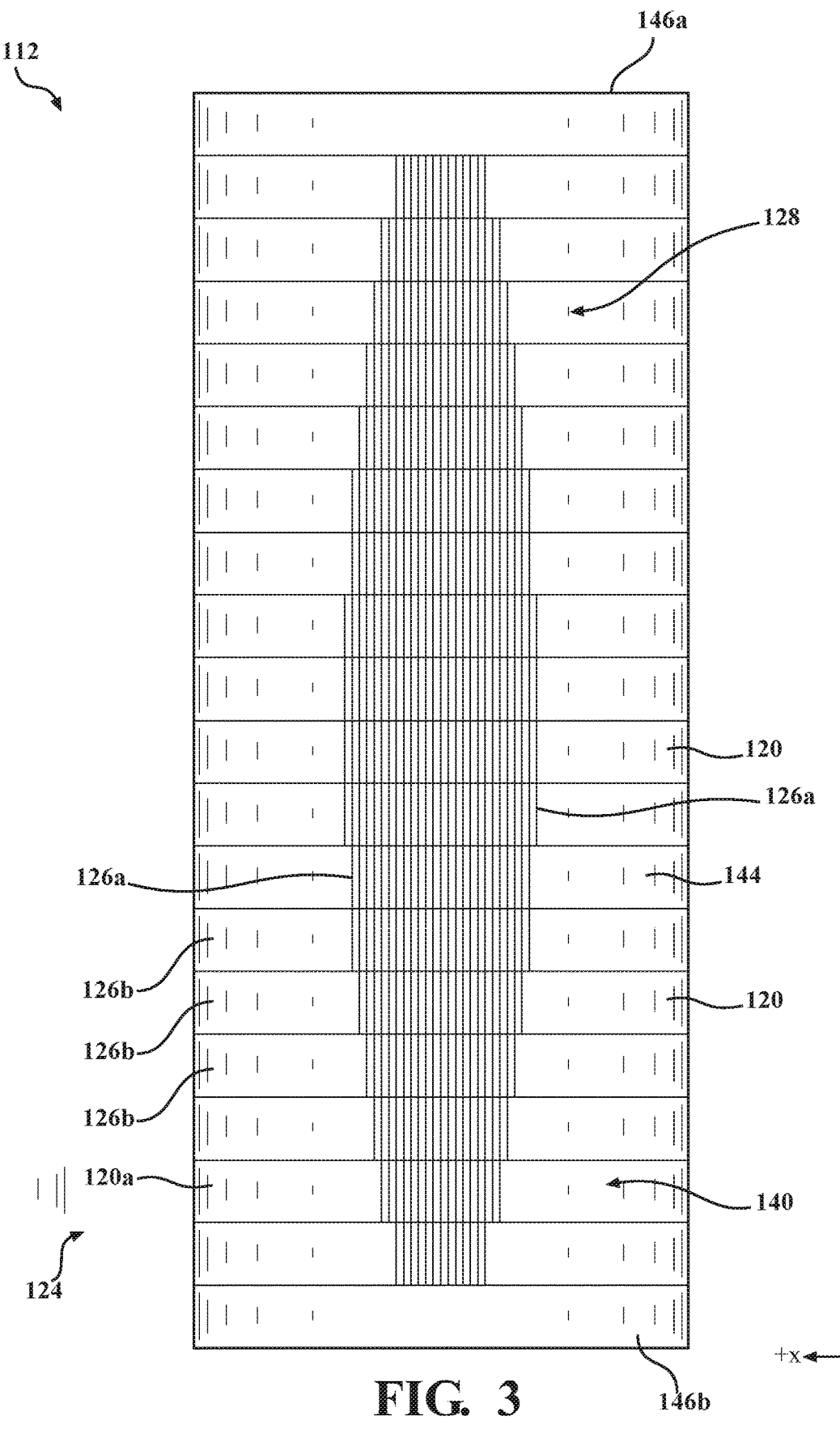
FIG. 3 schematically depicts an isolated front view of the first aspect of the composite material pattern of the emitter device of FIG. 2C, according to one or more embodiments shown and described herein.

Now referring to FIG. 2C and FIG. 3, a second aspect of a composite material pattern 128 of the emitter device 112 is schematically depicted. It is understood that the emitter device 112 is identical to the emitter device 12 with the exceptions of the features described herein. As such, like features will use the same reference numerals with a prefix "1" for the reference numbers. As such, for brevity reasons, these features will not be described again.

In the second aspect, the composite material pattern 128 includes a teardrop region 138 that surrounds the inner core 122. The teardrop region 138 is centered around an axis A1 and extends in the longitudinal direction (i.e., in the +/−X direction) from one side of the inner core 122. The composite material pattern 128 further includes a plurality of linear segments 140 extending vertically from an apex 142 of the teardrop region 138 and extend a length of the outer surface 120 of the emitter device 112 in the system vertical direction (i.e., in the +/−Z direction) to transverse the outer core 124, illustrated as the plurality of annular rings.

That is, it should be appreciated that in embodiments in which the outer core 124 is the plurality of annular rings, the plurality of annular rings are stacked on one another to form a column, as best seen in FIG. 3. The outer core 124 includes the high thermal conductivity material inlays 126a and the low thermal conductivity material matrix 126b, such as carbon aerogel. That is, the high thermal conductivity material inlays 126a may be inlayed into the low thermal conductivity material matrix 116b to form the composite material pattern 128 and the combination may form the outer core 124. In some embodiments, the emitter device 112 may be a copper/carbon aerogel anisotropic composite. The high thermal conductivity material inlays 126a are implemented from $\theta=90°$ to $\theta=270°$ based on the geometric location of the first receiver device 14. In this embodiment, the high thermal conductivity material inlays 126a are 1 millimeter thick at a 4 millimeter spacing in the composite material pattern 128. It should be understood that the high thermal conductivity material inlays 126a may be less than or more than 1 millimeter thick and at less than or more than 4 millimeter spacing in the composite material pattern 128.

It should be appreciated that when the plurality of annular rings are stacked, the high thermal conductivity material inlays 126a and the low thermal conductivity material matrix 126b may align with the high thermal conductivity material inlays 126a and the low thermal conductivity material matrix 126b of an adjacent annular ring to form the composite material pattern 128. As such, it should be appreciated that the composite material pattern 128 in FIG. 3 is viewed from the axis A1 extending in the −X direction such that the view is looking from the outside towards the −X direction. Further, it should be understood that the outer core 124 has a thickness so to circumferentially surround the inner core 122. Further, it should be understood that the outer core 24 may be a monolithic structure.

A plurality of linear segments 140 of the composite material pattern 128 extend vertically along a portion of the outer surface 120 and into at least a portion of the thickness of the emitter device 112. In some embodiments, the plurality of linear segments 140 curve inward towards the inner core 122 at the apex 142 of the teardrop region 138. In some embodiments, the composite material pattern 128 is uniform along the length of the outer surface of the emitter device 112 in the system vertical direction (i.e., in the +/−Z direction). In other embodiments, the composite material pattern 128 includes a widening pattern in the system lateral direction (i.e., in the +/−Y direction) such that the widest portion of the composite material pattern 128 is near a center 144 of the outer surface 120 of the emitter device 112. That is, the composite material pattern 128 is narrower in width at ends 146a, 146b than at the center 144.

Further, in some embodiments, the composite material pattern 128 transverses the outer core 124 (i.e., extends the entire length of the outer surface 120 of the outer core 124 of the emitter device 112 in the system vertical direction (i.e., in the +/−Z direction)). In other embodiments, as best seen in FIG. 3, the composite material pattern 128 begins and/or terminates before one or both ends 146a, 146b of the emitter device 112. A plurality of outer curved segments 148 form an outer portion 150 of the emitter device 112 by surrounding the remaining portions of the inner core 122 and the teardrop region 138. In some embodiments, at least a portion of the plurality of outer curved segments 148 are transverse to the composite material pattern 128. Further, the composite material pattern 128 may be narrower in areas in the system longitudinal direction (i.e., in the +/−X direction) than in other areas. It should be appreciated that this composite material pattern 128 creates an outer core anisotropic thermal conductivity that reduces the amount of heat and/or power transfer to the second receiver device 116 while increasing the amount of heat and/or power transfer to the first receiver device 114, as discussed in greater detail herein.

Figure 2D:
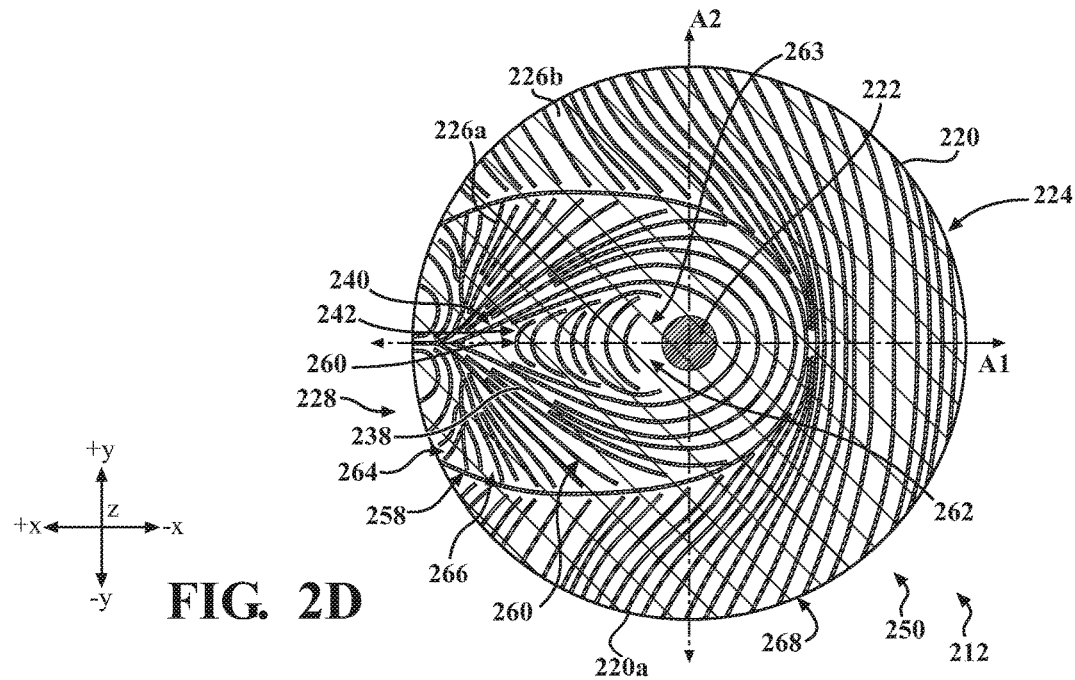
FIG. 2D schematically depicts a cross-sectional view of a third aspect of a composite material pattern of the emitter device of the heat transfer system of FIG. 1A taken from line 2-2, according to one or more embodiments shown and described herein.

Now referring to FIG. 2D, a third aspect of a composite material pattern 228 of the emitter device 212 is schematically depicted. It is understood that the emitter device 212 is identical to the emitter device 12 with the exceptions of the features described herein. As such, like features will use the same reference numerals with a prefix "2" for the reference numbers. As such, for brevity reasons, these features will not be described again. It should be appreciated that the emitter device 212 may be a copper/carbon aerogel metamaterial composite in which the composite material pattern 228 is found using a gradient-based homogenization design optimization technique to locally configure the anisotropic material thermal conductivity layout of the emitter device 212 in combination with the exterior surface emissivity profile of the outer surface 220, as discussed in greater detail herein.

Further, it should be appreciated that, in some embodiments, the composite material pattern 228 spans $\theta=-90°$ to $\theta=90°$ nearest to the second receiver device 16 with the composite material pattern 128 focusing the high thermal conductivity material inlays 126a directed towards the first receiver device 14. In some embodiments, the high thermal conductivity material inlays 126a are less than 1 millimeter thick at a variable millimeter spacing throughout the composite material pattern 128. It should be understood that the high thermal conductivity material inlays 126a may be more than 1 millimeter thick and the variable millimeter spacing may be uniform and/or non-uniform as described herein with respect to the composite material pattern 228.

The composite material pattern 228 includes the teardrop region 238 that surrounds the inner core 222 and also includes the plurality of linear segments 240 extending vertically from the apex 242 of the teardrop region 238. Further, the plurality of linear segments 240 extend a length of the outer surface 220 of the emitter device 212 in the system vertical direction (i.e., in the +/−Z direction) to transverse the outer core 24 (i.e., extends the length of the outer surface 20 of the outer core 24 of the emitter device 12 in the system vertical direction (i.e., in the +/−Z direction)). In this embodiment, the composite material pattern 228 further includes a flux field region 258. The teardrop region 238 of the composite material pattern 228 is positioned within the flux field region 258.

A plurality of curved segments 260 surround the inner core 222 and are positioned within and outside of the teardrop region 238. Further, a plurality of partial ellipses segments 262 and a plurality of semi-circular segments 263 are positioned within the teardrop region 238. In some embodiments, the plurality of partial ellipses segments 262 and/or the plurality of semi-circular segments 263 are positioned to be centered in the system longitudinal direction (i.e., in the +/−X direction) with respect to the inner core 222. Further, in some embodiments, the further away the plurality of partial ellipses segments 262 and the plurality of semi-circular segments 263 from the inner core the smaller the radius. A plurality of curvilinear segments 264 and a plurality of non-linear segments 266 that form a portion of the composite material pattern 228 are positioned within the flux field region 258 but not within the teardrop region 238. In some embodiments, it should be appreciated that the plurality of curved segments 260, the plurality of partial ellipses segments 262, the plurality of semi-circular segments 263, the plurality of curvilinear segments 264 and/or the plurality of non-linear segments 266 that form a portion of the composite material pattern 228 are curved towards and/or about the axis A1.

A plurality of outer nonlinear segments 268 surround the flux field region 258 such that the plurality of outer nonlinear segments 268 form the outer portion 250 of the emitter device 212 that surround the remaining portion of the inner core 222. In some embodiments, at least a portion of the plurality of outer nonlinear segments 268 are transverse to the composite material pattern 228.

It should be appreciated that the composite material pattern 228 is optimized for heat and/or power transfer between the emitter device 212 and the first receiver device 14 via the composite material pattern 228 while limiting the heat and/or power transfer to the second receiver device 16. The composite material pattern 228 generates the outer core anisotropic material thermal conductivity that is optimized for power transfer from the emitter device 212 to the first receiver device 14. That is, the composite material pattern 228 is an optimized composite material structure of the emitter device 212 to maximize power transfer via heat transfer from the emitter device 212 to the first receiver device 14 while limiting the power transfer to the second receiver device 16. As such, the composite material pattern 228 of the emitter device 212 may be a power transfer system that takes a heat from the emitter device 212 and directs the heat to an area where the heat may be beneficial and/or may not cause harm.

It should also be appreciated that the optimized composite material pattern 228 may be changed or altered to maximize the heat and/or power transfer to the first receiver device 14. In some embodiments, the optimized composite material pattern 228 may change based on the distance between the emitter device 212 and the receiver devices 14, 16. Further, the optimized composite material pattern 228 may change based on the type of material used in the emitter device 212. Further, it should be understood that while the composite material pattern 228 is optimized for heat and/or power transfer, composite material patterns 28, 128, 228 work in conjunction with an optimized emissivity distribution profile, that in some embodiments, is the surface coating and/or paint layer 20a on the outer surface 20, 120, 220 of the emitter device 12, 112, 212 respectively, for heat and/or power transfer, as discussed in greater detail herein.

Referring now to FIGS. 1A and 2D, it should be appreciated that, in embodiments, the optimization may utilize two design variables. One design variable is a spatially varying orientation angle, $\gamma \in [2, \pi]$, is specified for the high thermal conductive inlays 226a material direction of the solid and defines the anisotropic thermal conductivity tensor components, $k_{11}(\gamma)$, $k_{22}(\gamma)$, and $k_{12}(\gamma) = k_{21}(\gamma)$.

The second design variable is an angularly varying emitter surface emissivity, $\varepsilon(\theta) \in [0,1]$. It should be appreciated that the second design variable is specified to optimize far-field thermal emission through the use of engineered emissivity outer surface coatings and/or paint layer 20a on the outer surface 20 of the emitter device 12. The optimization objective function, $f_0$, is defined by an integral objective on the boundary of the first receiver device 14, $\Gamma_{R1}$, as the product of the surface irradiation of the first receiver device, $G_{R1}$, and the angularly dependent view factor due to the spatial configuration of the emitter device 12 and the first receiver device 14, $F_{e-R1} = 1 - F_{amb}(\varphi)$, as $$f_0 = \int G_{R1}[1 - F_{amb}(\varphi)] d\Gamma_{R1}.$$

where the ambient view factor, $F_{amb}$, is evaluated on the outer surface 34a of the first receiver device 14 based on the local angular position, $\varphi$, defined by the (x2, y2, z2) coordinate system (not shown) with origin coincident with the axial center of the first receiver device 14. The advantage of the optimization scheme, as described herein, is that it is highly adaptable to more complex scenes involving arbitrary, non-regular geometries with arbitrarily positioned receiver devices 14, 16.

With reference now to FIGS. 1-3, in some embodiments, the emitter devices 12, 112, 212 may be patterned or manufactured by a three-dimensional printer using techniques known to those skilled in the art. That is, the composite material patterns 28, 128, 228, the outer surface coating and/or paint layer 20a, the alternating materials of the outer core 24, and the like, may be each be manufactured by a three-dimensional printer, an additive fabrication method, and the like. Further, in some embodiments, the emitter devices 12, 112, 212, may be formed from multiple stacked molds to cast the low thermal conductivity material matrix 26b, 126b, 226b into the molds and the high thermal conductivity material inlays 26a, 126a, 226a are inlayed into the low thermal conductivity material matrix 26b, 126b, 226b to form the composite material patterns 28, 128, 228. It should be appreciated that there may be more ways to form the emitter devices 12, 112, 212, and/or the composite material patterns 28, 128, 228, and is not limited to those described herein.

It should be understood that the emitter devices 12, 112, 212 and the composite material patterns 28, 128, 228, the outer surface 20, the alternating materials of the outer core 24, and the like, provide a heat flow control in thermal metamaterials. That is, the emitter devices 12, 112, 212 and the composite material patterns 28, 128, 228, the outer surface 20, the materials of the outer core 24, and the like, directionally control the radiative transfer of heat between multiple bodies in a complex radiative scene. The emitter devices 12, 112, 212 are configured for the manipulation of heat transfer by conduction, where heat generated inside the inner core 22 is transferred by the composite material patterns 28, 128, 228, the alternating materials of the outer core 24, and the like to the outer surface 20.

For the numerical experiments, a steady-state conduction with surface-to-surface radiation heat transfer finite element solver is utilized to model the scene. The governing equation for heat conduction in a solid domain, $\Omega$, is $$\nabla \cdot (k \nabla T) = -Q \text{ in } \Omega,$$

where k is the solid body anisotropic thermal conductivity tensor, and Q is the volumetric heat source.

Further, a frequency independent surface-to-surface radiative condition on the boundary, r, specified as, $$q_r = \varepsilon(\theta)[G - e_b(T)] \text{ on } \Gamma,$$

where radiative heat flux, $q_r$, is a function of an angularly varying surface emissivity, $\varepsilon(\theta)$, the irradiation, G, and the blackbody hemispherical total emissive power, $e_b$ (T). The latter expression is governed by Stefan-Boltzmann's law, where $e_b$ (T) = $n^2 \sigma T^4$ with n as the refractive index (taken as unity) and $\sigma$ as the Boltzmann constant.

The surface irradiation is further expressed as $G = G_m + G_{ext} + G_{amb}$, where $G_m$ is the mutual irradiation, $G_{ext}$ is the irradiation due to external sources (assumed to be zero), and $G_{amb} = F_{amb} e_b(T_{amb})$ is the ambient irradiation. The ambient irradiation is a function of the ambient view factor, $0 \le F_{amb} \le 1$, which addresses the portion of the field of view not covered by other boundaries. Finally, in all prior expressions, T is the temperature state variable. The heat transfer by convection is neglected to isolate and investigate the physical effects of heat transfer by conduction versus radiation.

Figure 4A:
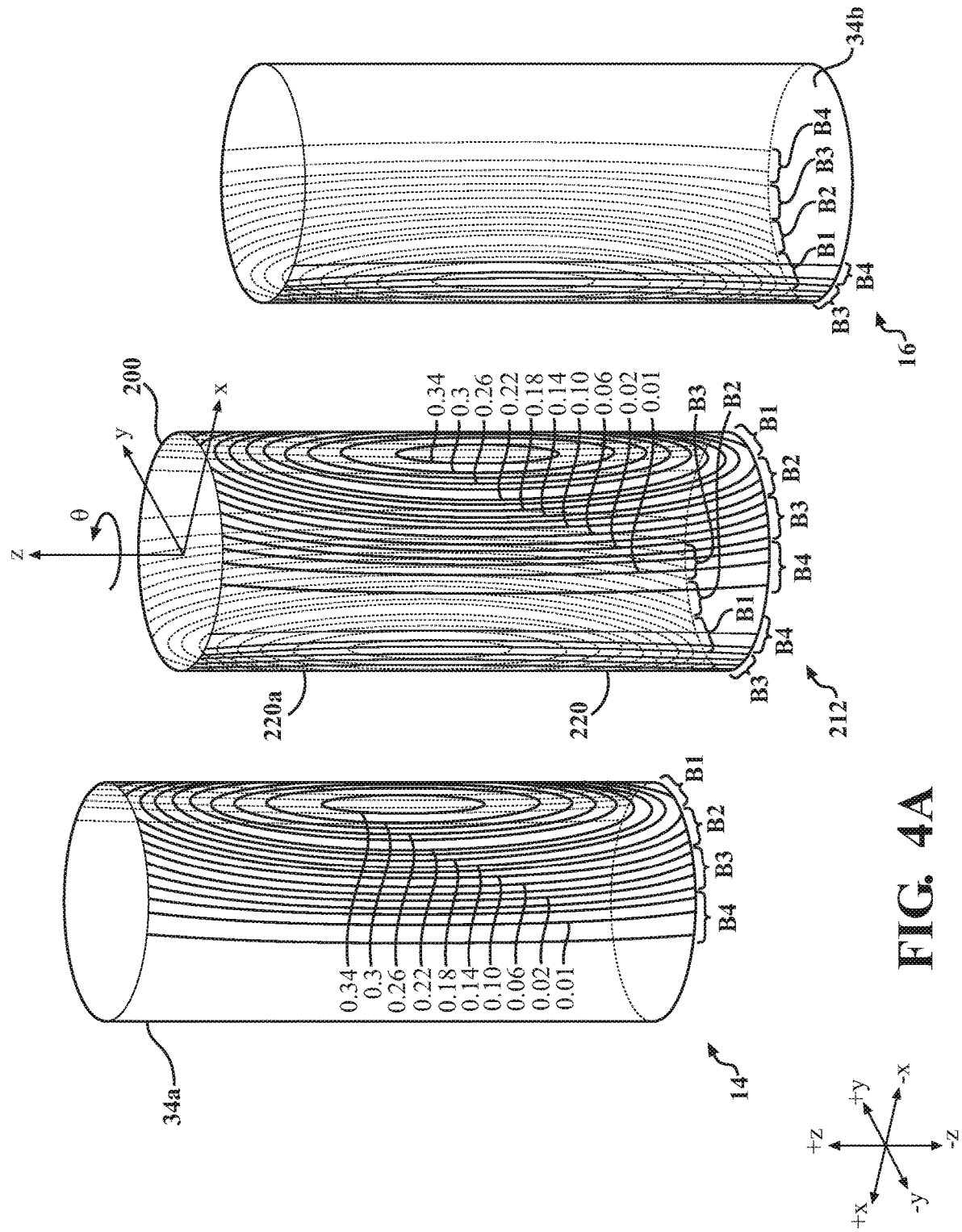
FIG. 4A schematically depicts a perspective and side view of the heat transfer system of FIG. 1 depicting view factor contours, according to one or more embodiments shown and described herein.
Figure 4B:
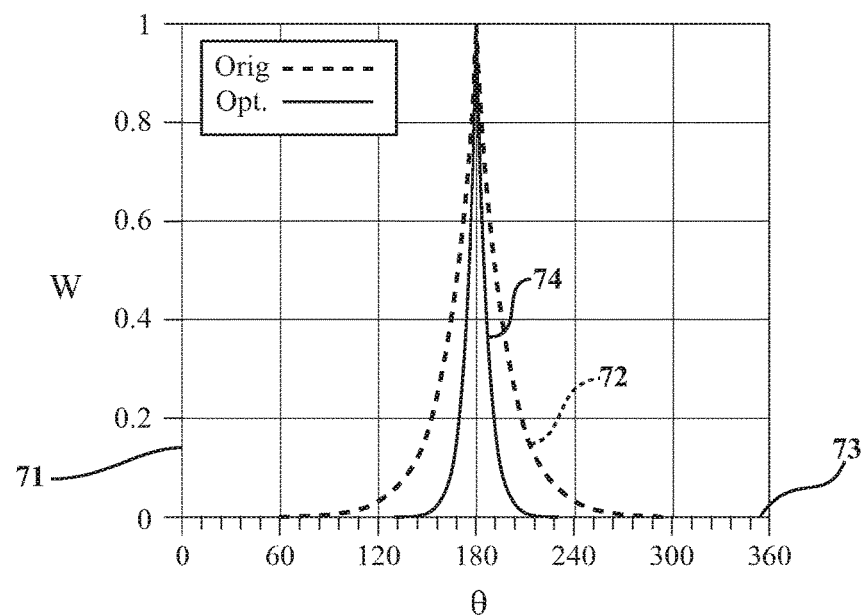
FIG. 4B schematically depicts an illustrative graphical representation of an emissivity surface coating and/or paint layer distribution graph, according to one or more embodiments shown and described herein.

Now referring to FIGS. 4A-4B, a view factor, $1-F_{amb}$, for the emitter device 212 and the first and second receiver devices 14, 16 is schematically depicted. It should be understood that the view factor is in the form of contours and is a function of the geometry between the shape of the emitter device 212 and the shape of the receiver devices 14, 16. Further, the view factor is dependent on the geometry between the positions of the emitter device 212 with respect to the receiver devices 14, 16. As illustrated, the geometry permits a differing view factor between each of the receiver devices 14, 16 with respect to the emitter device 212. At its peak, illustrated by the bracket B1, the view factor is approximately 0.35. As shown, the peak view factor extends a length of the outer surface 220 of the emitter device 212 and is generally when a theta (θ) is at 180 degrees, or aligned with the X-axis which passes through the center of the emitter device 12 and both centers of the receiver devices 14, 16, as discussed in greater detail herein. Further, the bracket B1 is coaxially aligned with both the emitter device 212 and each of the receiver devices 14, 16 such that the peak view factor is projected along the X axis, or when theta (θ) is at 180 degrees, as discussed in greater detail herein.

On either side of the peak view factor B1 (i.e., deviating from the x-axis or 180 degrees), the view factor begins to decrease between ranges of 0.26 to 0.17, illustrated by the bracket B2. Further, on either side of the bracket B2 (i.e., further deviating from the x-axis or 180 degrees) is another decreased range between 0.13 to 0.09, illustrated by the bracket B3. Finally, on either side of the bracket B3 (i.e., furthest deviation from the x-axis or 180 degrees) is another decreased range between 0.09 to 0.01, illustrated by the bracket B4. It should be appreciated that the view factor is the highest on the contours of the emitter device 212 and the receiver devices 14, 16 at the 180 degrees position, or the X axis, and then begins to taper off when there is a deviation from the X-axis. Further, it should be appreciated that the losses from the deviation and/or from the view factor at the peak B1 may be ambient losses.

The emissivity outer surface coating and/or paint layer 20a of the outer surface 20 may be in synchronization with the view factor scene to further enhance directional emission to a selected receiver, such as the first receiver. Through this example, it should be appreciated that the method is shown to be flexible and may be applied to complex multi-body scenes, where multiple modes of heat transfer exist.

FIG. 4B schematically illustrates an emissivity surface coating and/or paint layer distribution graph as a function of an angle plotted on an ordinate 71, versus the angle theta (θ) plotted as an abscissa 73. It should be understood that the emissivity distribution refers to the emissivity of the surface of a material based on the material's effectiveness in emitting energy as thermal radiation. Thermal radiation is electromagnetic radiation and it may include both visible radiation (light) and infrared radiation. Further, the emissivity of an object may be manipulated by paint on a surface as described herein. As such, in embodiments, the emissivity distribution graph of FIG. 4B is an experimentation between an emitter device that is painted to manipulate the emissivity, known herein as the original painted profile 72 and/or as the non-optimized directional emissivity coating 72, illustrated as a dashed line and an optimized emissivity profile 74, which may include the surface coating and/or paint layer 20a (FIG. 1), illustrated as a solid line.

Theta (θ), at the zero positon, is aligned with the X axis. Upon rotation of the emitter device 212, at 180 degrees, the emitter device 212 and the composite material pattern 228 is aligned and facing the first receiver device 14. As illustrated, at this position, the optimized emissivity profile 74 of the emitter device 212 is an optimized outer surface coating and/or paint layer distribution that includes an exponential function, which is increased exponentially at the 180 degrees position. That is, the optimization distribution of the optimized emissivity profile 74 of the emitter device 212 follows the exponentially function with a much sharper peak than that of the original painted profile 72. As such, the optimized emissivity profile 74 has a narrower profile to achieve the maximum peak aligned with the view factor compared to the original painted profile 72. For example, when the emitter device 212 is being rotated to the aligned 180 degrees, the optimized emissivity profile 74 has a starting/ending deviation of approximately +/−40 degrees during the rotation theta (θ). The original painted profile 72 has a starting/ending deviation of approximately +/−120 degrees. As such, the ambient losses of the optimized emissivity profile 74 are much less compared to the losses of the original painted profile 72.

As such, the optimized emissivity outer surface coating and/or paint layer profile 74 is focused more on the contours of the view factor creating higher levels that align along the 180 degrees (i.e., the composite material pattern 228 is aligned with the outer surface 34a of the first receiver device 14). That is, as the view factor increases, more power transfer may occur between the emitter device 212 to the first receiver device 14 because there is a greater amount of radiation and power transfer from the emitter device 212 to the first receiver device 14. As such, the optimized emissivity profile 74 (e.g., the optimized outer surface coating and/or paint layer 20a of the outer surface 20 of the emitter device 212 (FIGS. 1A-1B) has a more efficient and greater power transfer compared to the original painted profile 72.

Figure 5:
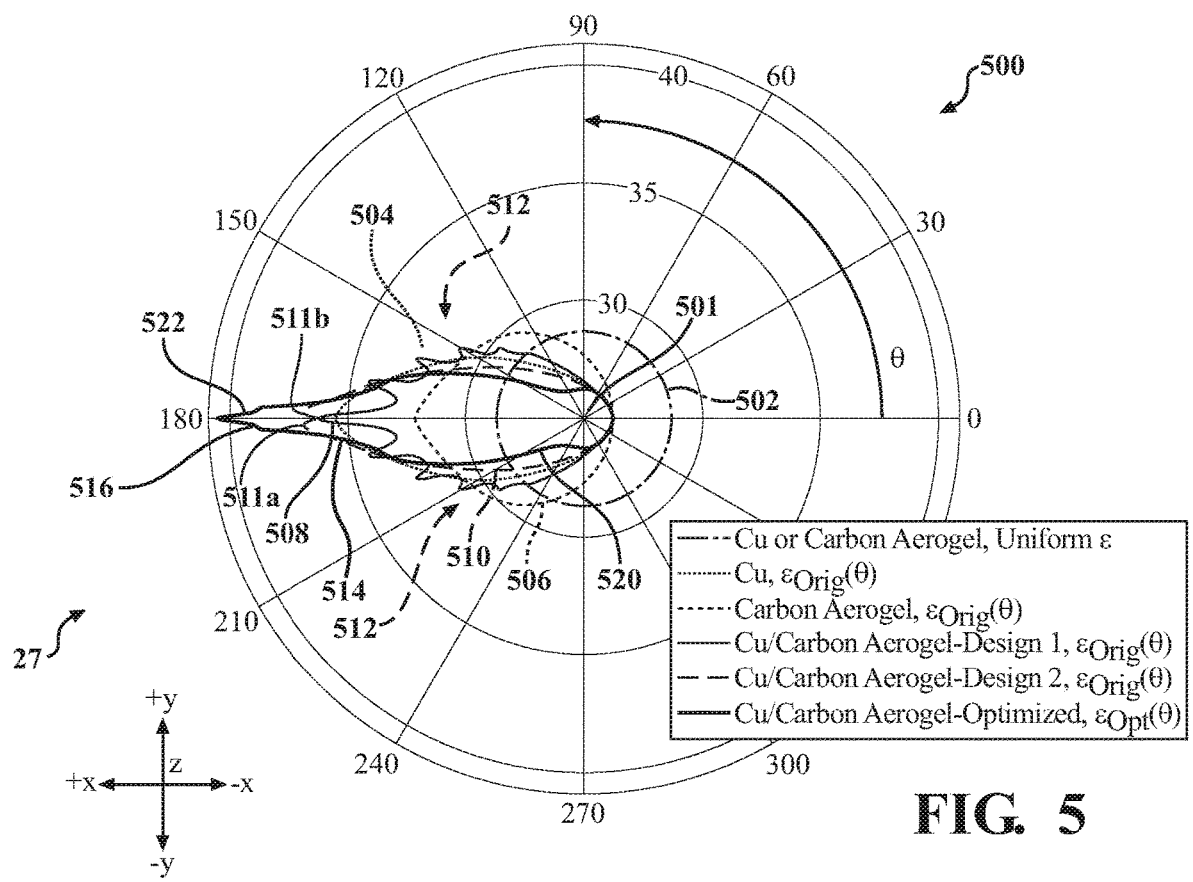
FIG. 5 schematically depicts an illustrative graphical representation of a directional heat flux based on the composite material pattern, according to one or more embodiments shown and described herein.

Now referring to FIG. 5, a radiative intensity graph 500 that corresponds to various emitter devices is schematically depicted. The radiative intensity of the various emitter devices is graphed as it varies as a function of the theta θ. It should be appreciated that the radiative intensity graph 500 is graphed such that the radiative intensity of the various emitter devices is a function of both an anisotropic conductive material design of the emitter device and an emissivity outer surface and/or paint layer profile design on the outer surface of the emitter device. As such, it should be appreciated that the radiative intensity shows a combined effect of both the conductive material design and the emissivity profile design. That is, the low thermal conductivity material matrix 26b, 126b, 226b with the high thermal conductivity material inlays 26a, 26a, 226a along with the composite material pattern 28, 128, 228 (FIGS. 2B-2D) affect the radiative intensity differently than the emitter having the outer surface simply painted, as described above.

The radiative intensity graph 500 includes an origin 501 and an outermost portion 503 along a 180 degree axis. It should be appreciated that in some embodiments, the distance between the origin 501 and the outermost portion 503 is illustrated as the experimental setup of 350 millimeters, as discussed above with respect to FIGS. 1A-1B. That is the same distance between the inner core 22 and the emitter device 12 (FIG. 1A) to the center of the first receiver device 14 (FIG. 1A) is 350 millimeters. This is a non-limiting example and the distance may be more or less than 350 millimeters.

A uniform copper or uniform carbon aerogel emitter device 502, with a uniform emissivity of 0.8, illustrated as a longer dash separated by a short dash, has a uniform radiative intensity that is centered at the origin 501. That is, the uniform copper or uniform carbon aerogel emitter device 502 emits heat and/or power in a uniform or symmetrical 360-degree pattern around the origin 501 such that the emissivity distribution of the surface of the uniform copper or uniform carbon aerogel emitter device 502 is uniform. A pure copper emitter device 504, with the non-optimized directional emissivity coating 72 (FIG. 4B) illustrated as a plurality of short dashes, emits a radiation that is pointing towards the 180-degree axis from the origin 501 such that the radiative intensity distribution pattern of the surface of the pure copper emitter device 504 is teardrop shaped. It should be appreciated that the pure copper emitter device 504 may be coated with a combination surface coating of electro-plated copper, polished silver, polysiloxane/Al composite coatings, carbon pigmented paints, and the like.

A pure carbon aerogel emitter device 506, with the non-optimized directional emissivity coating 72 (FIG. 4B), illustrated as a plurality of medium dashes, emits radiation that is a generally oblong circular shape having base and a point. The point is aimed towards the 180 degree axis and the base continues slightly behind the origin 501 and centered along the 0 degree axis. The point of oblong circular shape of the pure carbon aerogel emitter device 506 emits less in the 180 degree axis direction than that of the pure copper emitter device 504 due to the lower thermal conductivity of carbon aerogel. A first combination emitter device 508, which is the emitter device 12 with the composite material pattern 28 (FIG. 2B) and with the non-optimized directional emissivity coating 72 (FIG. 4B) is illustrated with a solid line. The first combination emitter device 508 emits a radiation that is pointed to the 180 degree axis and includes a plurality of spokes 512 radiating outward from the 180 degree axis and terminating at peak 514 that is centered on the 180 degree axis. As such, it should be understood that the plurality of spokes 512 are extending from the outer surface 20 of the emitter device 12 (FIG. 2B). The plurality of spokes 512 indicate changes in the radiative intensity at angular locations (such as, in a non-limiting example, every 10 degrees) that coincide with the radially diverging high thermal conductivity material inlays 26a that fall within the range of θ=120° to θ=240°. The emitted radiation of the first combination emitter device 508 is greater than that of the pure copper emitter device 504. The emitted radiation of the first combination emitter device 508 is a more narrow emissivity distribution pattern than the pure copper emitter device 504 indicating a better, or sharper peak of optimized distribution emissivity profile than that of the pure copper emitter device 504.

A second combination emitter device 510, which is the emitter device 112 with the composite material pattern 128 (FIG. 2C) and with the non-optimized directional emissivity coating 72 (FIG. 4B) is illustrated with medium dashed lines. The second combination emitter device 510 emits a radiation that is pointed to the 180 degree axis and includes a pair of peaks 511a, 511b that straddle the 180 degree axis. The emitted radiation of the second combination emitter device 510 is greater than that emitted by the first combination emitter device 508 along the 180 degree axis. Further, the emitted radiation of the first combination emitter device 508 is a wider emissivity distribution pattern with respect to the 180 degree axis than the second combination emitter device 510.

A third combination emitter device 516, which is the emitter device 212 with the composite material pattern 228 (FIG. 2D) and with the optimized directional emissivity profile 74 (FIG. 4B) is illustrated with a bold solid line. The third combination emitter device 516 emits a radiation that is pointed along the 180 degree axis and includes a rounded base portion 518 with a narrowing peak 520 that extends along the 180 degree axis further than the pair of peaks 511a, 511b of the first combination emitter device 508. The narrowing peak 520, or sharper peak at θ=180° matches the result for the optimized emissivity profile 74 (FIG. 4B). Further, the rounded base portion 518 of the third combination emitter device 516 is a narrower emissivity distribution pattern with respect to the 180 degree axis than the first combination emitter device 508 and the second combination emitter device 510. As such, the third combination emitter device 516 emits a better, or sharper peak of optimized distribution emissivity profile than the first combination emitter device 508 and the second combination emitter device 510.

That is, the third combination emitter device 516 with the optimized thermal composite metamaterial design coupled with the composite material pattern 228 (FIG. 2D) significantly enhances the focusing and cloaking of heat flow toward the outer surface 220 of the emitter device 212 to positively benefit radiative response.

The radiative intensity of the emitter device 212 may be enhanced with the optimized composite material pattern 228. That is, in some embodiments, it should be appreciated that the third combination emitter device 516 illustrates a maximized power transfer to the first receiver device 14. In some embodiments, the second combination emitter device 510 may be useful when a receiver device is configured to receive power to multiple locations. As such, in this embodiment, the second combination emitter device 510 may provide for an efficient transfer of energy to the multiple locations.

It should be appreciated that the radiative intensity patterns and control thermal energy transfer through the composite material pattern 28, 128, 228 and the outer surface coating and/or paint layer 20a of the outer surface 20 (i.e. the design of both internal material layout and external surface properties) of the emitter devices 12, 112, 212 are customizable to achieve a desired heat and/or power transfer result.

Figure 6B:
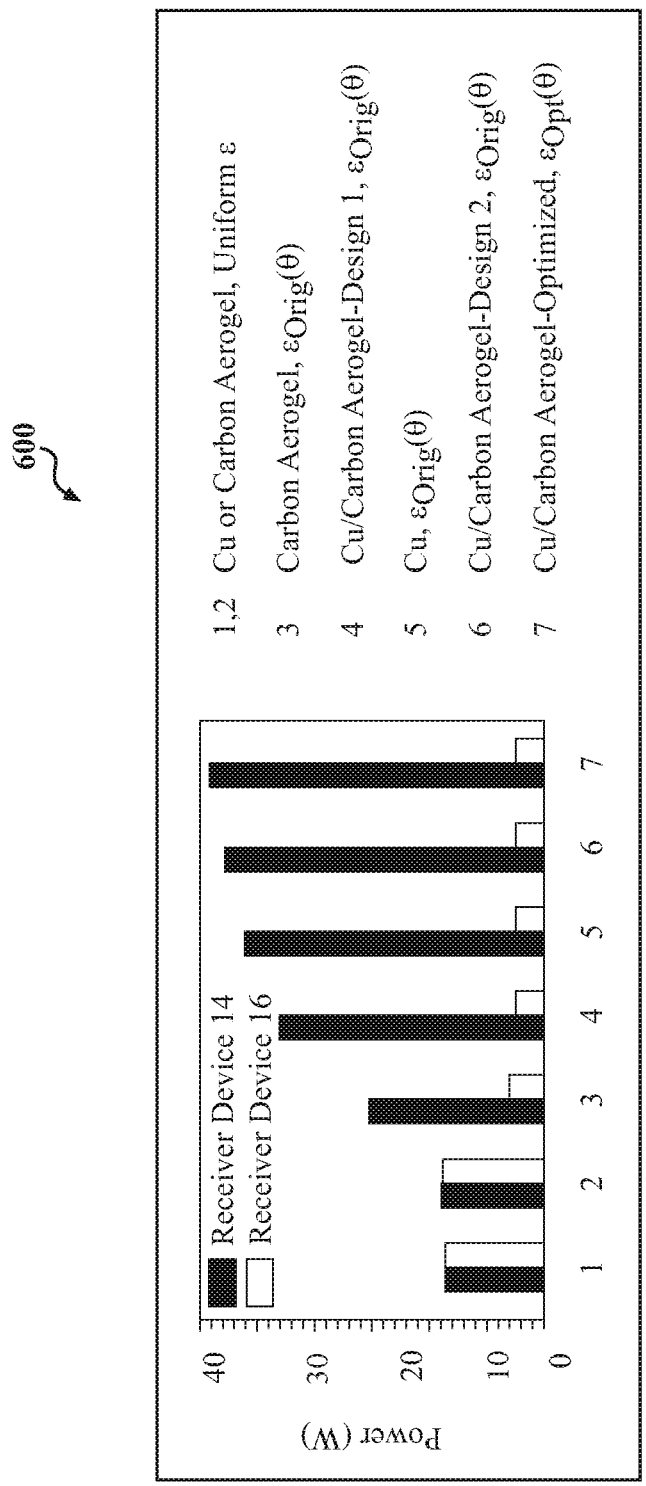
FIG. 6B schematically depicts an illustrative graphical representation of the heat transfer system of FIG. 6A where the heat flux is transmitted from the emitter device to the first and second receivers, according to one or more embodiments shown and described herein.

Now referring to FIGS. 6A-6B, a heat flux 602 on the receiver devices 14, 16 is schematically depicted. The heat flux 602 on the contour of the outer surface 34a of the first receiver device 14 receives significantly more power from the emitter device 212 than that received by the outer surface 34b of the second receiver device 16. The heat flux 602 receives the most power (W/cm$^2$) at the center portion, illustrated by the bracket H1. In this region, the power received may be in a range between 2.0 W/cm$^2$ to 1.8 W/cm$^2$. The area outlining the center portion, illustrated with the brackets H2, may receive power in a range between 1.6 W/cm$^2$ to 1.4 W/cm$^2$. The next highest area receiving power, illustrated with the brackets H3, may receive power in a range between 1.2 W/cm$^2$ to 1.0 W/cm$^2$. The next area receiving power, illustrated with the brackets H4, may receive power in a range between 0.8 W/cm$^2$ to 0.4 W/cm$^2$. The remainder of the first receiver device 14 and the entire outer surface 34b (or circumference) of the second receiver device 16 may receive power in a range between 0.2 W/cm$^2$ to 0.0 W/cm$^2$. It should be understood that these ranges herein are non-limiting and that the ranges may be greater or less than the ranges provided above for different portions of the receiver devices 14, 16.

As illustrated by the bar chart 600 in FIG. 6B, the receiver devices 14, 16 each receive an equal amount of power from the uniform copper emitter device and/or the uniform carbon aerogel emitter device (i.e., the baseline emitter device 12' of FIG. 2A). The next higher power split is with the pure aerogel emitter device with the non-optimized directional emissivity coating 72 (FIG. 4B). The next higher power split is with first combination emitter device, which is the emitter device 12 with the composite material pattern 28 (FIG. 2B) and with the non-optimized directional emissivity coating 72 (FIG. 4B). Next, the first receiver device 14 receives more power than the second receiver device 16 in the pure copper emitter device example with the non-optimized directional emissivity coating 72 (FIG. 4B). Then the next higher power split is with second combination emitter device 510, which is the emitter device 112 with the composite material pattern 128 (FIG. 2C) and with the non-optimized directional emissivity coating 72 (FIG. 4B). The highest power split is with the third combination emitter device 516, which is the emitter device 212 with the composite material pattern 228 (FIG. 2D) and with the optimized directional emissivity coating 74 (FIG. 4B).

It should be appreciated that the embodiments described herein relate to a multimode heat transfer system and/or a power transfer system. The system includes an emitter device and a receiver device. The emitter device includes an inner core surrounded by an outer core having a thickness and an outer surface. A composite material pattern extends through at least a portion of the outer surface and at least a portion of the thickness of the outer core and is thermally coupled to the inner core. The composite material pattern directs a heat from the inner core to an object other than the emitter device. The composite material pattern may be a plurality of shapes and sizes and may be optimized to maximize a heat and/or power transfer. Further, the outer core may be a monolithic structure or may be manufactured using a plurality of segments. As described herein, for experimental purposes, the outer core was formed from a plurality of annular rings. The outer core and the composite material pattern are formed from materials that includes a low thermal conductivity material matrix and a high thermal conductivity inlay material. The outer core may be painted or coated based on an optimized emissivity distribution.

The thermal composite metamaterials with co-optimized anisotropic thermal conductivity and external surface emissivity have been demonstrated through numerical experiments. Further, radiative intensity reveals that the optimized configuration provides the greatest control in the directivity of thermal power transfer beyond either standalone design of surface emissivity or material thermal conductivity. As such, the outer core and the composite material pattern with the outer surface coating and/or paint layer may be customizable such that radiative intensity patterns are customizable and control thermal energy transfer for complex multi-body scenes through informed combined engineering of internal composite material layout and external surface properties.

Figure 7:
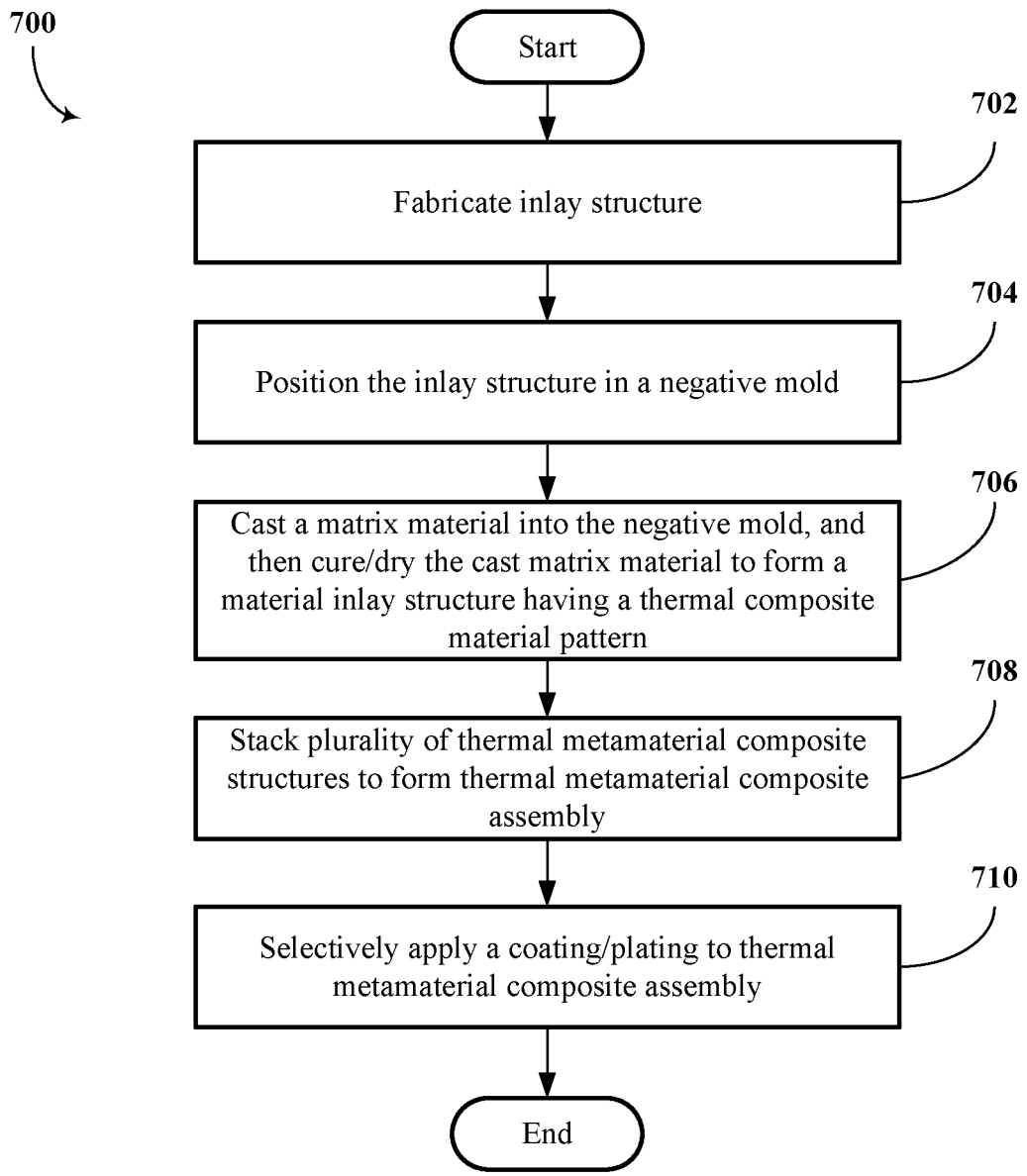
FIG. 7 is a schematic diagram of an example of a method of fabricating a multi-mode heat transfer device, according to one or more embodiments shown and described herein.
Figure 8:
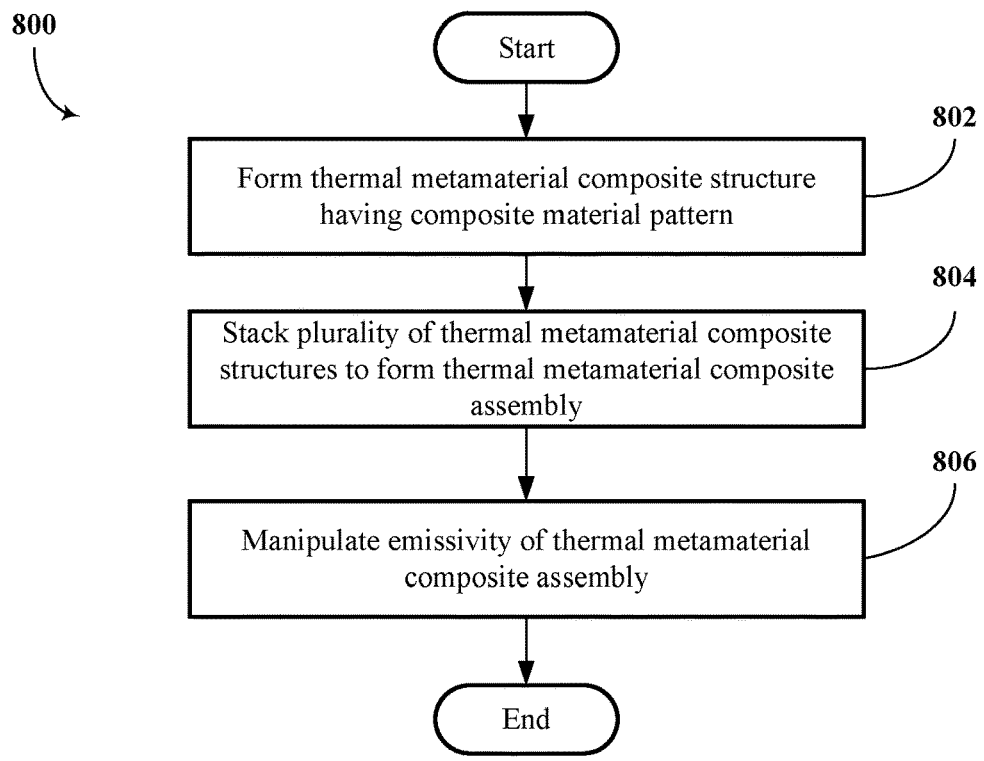
FIG. 8 is a schematic diagram of an example of a method of fabricating a multi-mode heat transfer device, according to one or more embodiments shown and described herein.
Figure 9:
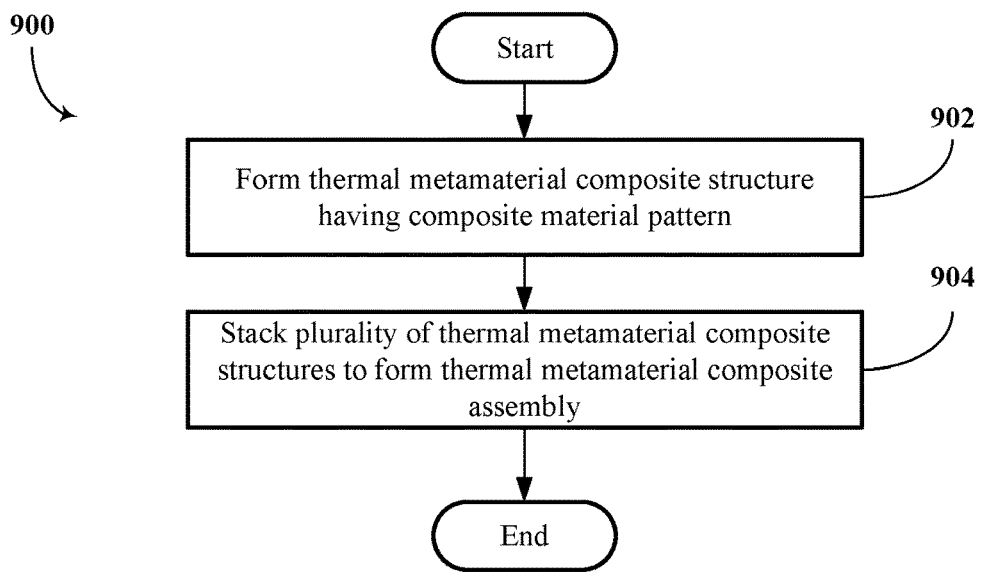
FIG. 9 is a schematic diagram of an example of a method of fabricating a multi-mode heat transfer device, according to one or more embodiments shown and described herein.

As illustrated in FIGS. 7 through 9, methods 700, 800, and 900 of fabricating a multi-mode heat transfer device is provided. Such a multi-mode heat transfer device may comprise, for example, a thermal composite metamaterial emitter which exhibits thermal conduction and thermal radiation. Such a heat transfer device, for example, may comprise any one of the devices illustrated in FIGS. 1 through 6. In accordance with embodiments, each respective method 700 and 800 may be implemented, for example, in logic instructions (e.g., software), configurable logic, fixed-functionality hardware logic, etc., or any combination thereof. Embodiments, however, are not limited thereto, and thus, each respective methods 700, 800, and 900 may be implemented in any manner that falls within the spirit and scope of the principles of this disclosure set forth herein.

Moreover, although the illustrated embodiments include a multi-mode heat transfer device having a cylindrical geometric structural configuration, embodiments are not limited thereto. As an example, the multi-mode heat transfer device may have a uniform geometric shape, a non-uniform geometric shape, an irregular geometric shape, and the like.

In FIG. 7, illustrated method block 702 involves fabricating an inlay structure composed of a high thermally conductive material. In accordance with one or more embodiments, the high thermally conductive material may comprise a metal or graphite. Embodiments, however, are not limited thereto, and thus, the high thermal conductive material may comprise other materials that fall within the spirit and scope of the principles of this disclosure set forth herein. In accordance with one or more embodiments, the fabrication technique used may comprise one or more of milling, casting, and additive fabrication such as selective laser sintering (SLS) and stereolithography. Embodiments, however, are not limited thereto, and thus, other fabrication techniques may be used that fall within the spirit and scope of the principles of this disclosure set forth herein.

The method 700 may then proceed to illustrated process block 704, which includes positioning the inlay structure in a negative mold.

The method 700 may then proceed to illustrated process block 706, which includes casting a matrix, composed of a low thermally conductive material, into the negative mold having the inlay structure. In accordance with one or more embodiments, the low thermally conductive material may comprise polydimethylsiloxane (PDMS), a polymer (low thermal conductivity), or a carbon-aerogel. Embodiments, however, are not limited thereto, and thus, the low thermal conductive material may comprise other materials that fall within the spirit and scope of the principles of this disclosure set forth herein. The cast matrix material is then cured/dried such that the inlay structure and the matrix may have a composite metamaterial pattern. Process block 706 may be repeated (in parallel or in sequence) to form a plurality of thermal metamaterial composite structures.

The method 700 may then proceed to illustrated process block 708, which includes stacking a plurality of thermal metamaterial composite structures in a stacked formation to form a thermal metamaterial composite assembly. Meaning, in process block 708, the thermal metamaterial composite structures or sub-assemblies are removed from their respective molds to assemble them into a larger assembly using alignment features (e.g. pins with or without fasteners, as necessary). This will yield a thermal metamaterial composite assembly that includes an alignment of thermal metamaterial composite structures in which the composite material pattern is thermally coupled to the inner core.

The method 700 may then proceed to illustrated process block 710, which includes selectively applying a coating or a plating to one or more exterior/outer surface regions of the thermal metamaterial composite assembly. Meaning, a functionally graded coating structure is to be applied to one or more selective regions at the outer or exterior surface of the thermal metamaterial composite assembly to define a functionally graded emissivity. In that way, the emissivity of the multi-mode heat transfer device may be manipulated through the application of a coating or a plating to one or more selective exterior/outer surface regions (See, FIG. 4B).

In accordance with one or more embodiments, selectively applying the coating or the plating may comprise selectively applying a mask to the exterior surface of the stacked annular ring formation.

Additionally or alternatively, selectively applying the mask may comprise applying a paint of different emissivity to realize a spatially graded emissivity profile. For example, the exterior surface of the stacked annular ring formation may be selectively painted with one or more of: a carbon black paint (which has a very high emissivity of 0.9) and a polysiloxane/aluminum composite coating (which has a varying emissivity in a range between 0.15 to 0.5, depending on the aluminum content).

Additionally or alternatively, selectively applying the coating or the plating may comprise selectively plating the exterior surface of the stacked annular ring formation with different emissivity metal layers. For example, the exterior surface of the stacked annular ring formation may receive a polished metal plating, such as silver, which has very low emissivity of 0.02.

In FIG. 8, illustrated method block 802 includes forming a thermal metamaterial composite structure that includes an inner core to radiate heat and an outer core that at least partially surrounds the inner core, the outer core including a high thermally conductive material inlay and a low thermally conductive material matrix that form a composite material pattern to thermally concentrate and direct heat radiated by the inner core to an area outside of the multi-mode heat transfer device, and thermally cloak heat radiated by the inner core. Alternatively, method block 802 may include forming a thermal metamaterial composite structure that includes an outer core having a high thermally conductive material inlay and a low thermally conductive material matrix that form a composite material pattern to thermally concentrate and direct heat radiated by a heat source in the multi-mode heat transfer device while also thermally cloaking heat radiated by the heat source.

Process block 802 may be repeated (in parallel or in sequence) to form a plurality of thermal metamaterial composite structures or sub-assemblies that will subsequently form a stacked thermal metamaterial composite assembly.

In accordance with one or more embodiments, the high thermal conductive material may comprise a metal or graphite and the low thermal conductive material may comprise polydimethylsiloxane (PDMS), a polymer (low thermal conductivity), or a carbon-aerogel. Embodiments, however, are not limited thereto, and thus, the high thermal conductive material and the low thermal conductive material may respectively comprise other materials that fall within the spirit and scope of the principles of this disclosure set forth herein.

The method 800 may then proceed to illustrated process block 804, which includes stacking a plurality of thermal metamaterial composite structures in a stacked formation to form a thermal metamaterial composite assembly. Meaning, in process block 804, the thermal metamaterial composite structures or sub-assemblies are removed from their respective molds to assemble them into a larger assembly using alignment features (e.g. pins with or without fasteners, as necessary). This will yield a thermal metamaterial composite assembly that includes an alignment of thermal metamaterial composite structures.

The method 800 may then proceed to illustrated process block 806, which includes manipulating the emissivity of the thermal metamaterial composite assembly by selectively applying a coating or a plating to one or more outer surface regions of the outer core to enhance the transfer of heat by the composite material pattern (See, FIG. 4B). Meaning, a functionally graded coating structure is to be applied to one or more selective regions at the outer or exterior surface of the thermal metamaterial composite assembly to define a functionally graded emissivity.

In accordance with one or more embodiments, selectively applying the coating or the plating may comprise selectively applying a mask to the exterior surface of the stacked annular ring formation.

Additionally or alternatively, selectively applying the mask may comprise applying a paint of different emissivity to realize a spatially graded emissivity profile. For example, the exterior surface of the stacked annular ring formation may be selectively painted with one or more of: a carbon black paint (which has a very high emissivity of 0.9) and a polysiloxane/aluminum composite coating (which has a varying emissivity in a range between 0.15 to 0.5, depending on the aluminum content).

Additionally or alternatively, selectively applying the coating or the plating may comprise selectively plating the exterior surface of the stacked annular ring formation with different emissivity metal layers. For example, the exterior surface of the stacked annular ring formation may receive a polished metal plating, such as silver, which has very low emissivity of 0.02.

In FIG. 9, illustrated method block 902 includes forming a thermal metamaterial composite structure that includes an inner core to radiate heat and an outer core that at least partially surrounds the inner core, the outer core including a high thermally conductive material inlay and a low thermally conductive material matrix that form a composite material pattern to thermally concentrate and direct heat radiated by the inner core to an area outside of the multi-mode heat transfer device, and thermally cloak heat radiated by the inner core. Alternatively, method block 902 may include forming a thermal metamaterial composite structure that includes an outer core having a high thermally conductive material inlay and a low thermally conductive material matrix that form a composite material pattern to thermally concentrate and direct heat radiated by a heat source in the multi-mode heat transfer device while also thermally cloaking heat radiated by the heat source.

Process block 902 may be repeated (in parallel or in sequence) to form a plurality of thermal metamaterial composite structures or sub-assemblies that will subsequently form a stacked thermal metamaterial composite assembly.

In accordance with one or more embodiments, the high thermal conductive material may comprise a metal or graphite and the low thermal conductive material may comprise polydimethylsiloxane (PDMS), a polymer (low thermal conductivity), or a carbon-aerogel. Embodiments, however, are not limited thereto, and thus, the high thermal conductive material and the low thermal conductive material may respectively comprise other materials that fall within the spirit and scope of the principles of this disclosure set forth herein.

The method 900 may then proceed to illustrated process block 904, which includes stacking a plurality of thermal metamaterial composite structures in a stacked formation to form a thermal metamaterial composite assembly. Meaning, in process block 904, the thermal metamaterial composite structures or sub-assemblies are removed from their respective molds to assemble them into a larger assembly using alignment features (e.g. pins with or without fasteners, as necessary). This will yield a thermal metamaterial composite assembly that includes an alignment of thermal metamaterial composite structures.

In accordance with the methods 700, 800, and 900, the one or more embodiments, the composite material pattern may comprise a first composite material pattern region having a structural configuration comprising one or more segments with an orientation which thermally concentrates and directs heat radiated by the inner core to an area outside of the multi-mode heat transfer device. Meaning, the first composite material pattern region is configured to facilitate an enhanced temperature gradient at a specific region of the multi-mode heat transfer device. Such a region may comprise the one or more outer surface regions of the outer core having the emissivity coating or a plating. The first composite material pattern region is also configured to facilitate direct thermal communication between the multi-mode heat transfer device and an object and/or area situated adjacent to that specific region of the multi-mode heat transfer device.

In accordance with the methods 700, 800, and 900, the composite material pattern may comprise a second composite material pattern region having a structural configuration comprising one or more segments with an orientation which thermally cloaks or shields heat radiated by the inner core. Meaning, the second composite material pattern region is configured to facilitate a reduced temperature gradient at a specific region of the multi-mode heat transfer device. The second composite material pattern region is also configured to reduce or prevent direct thermal communication between the multi-mode heat transfer device and an object/area situated adjacent to that specific region.

In accordance with the methods 700, 800, and 900, the composite material pattern may comprise a third composite material pattern region having a structural configuration comprising one or more segments with an orientation which thermally guides heat radiated by the inner core to a specific region in the multi-mode heat transfer device. For example, the third composite material pattern region may be configured to guide at least a portion of the heat radiated by the inner core in a direction towards the first composite material pattern region. The third composite material pattern region may be located within the first composite material pattern region, or located outside of the first composite material pattern region. As another example, the third composite material pattern region may be configured to guide at least a portion of the heat radiated by the inner core in a direction towards the second composite material pattern region. The third composite material pattern region may be located within the second composite material pattern region, or located outside of the second composite material pattern region.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of fabricating a multi-mode heat transfer device, the method comprising:
    forming a thermal metamaterial composite structure that includes an inner core to radiate heat and an outer core that at least partially surrounds the inner core, the outer core including a high thermally conductive material inlay and a low thermally conductive material matrix that form a composite material pattern to thermally concentrate and direct heat radiated by the inner core to an area outside of the multi-mode heat transfer device, while also thermally cloaking heat radiated by the inner core;
    stacking a plurality of thermal metamaterial composite structures in a stacked formation to form a thermal metamaterial composite assembly; and
    manipulating the emissivity of the thermal metamaterial composite assembly by selectively applying a coating or a plating to one or more outer surface regions of the outer core to enhance the transfer of heat by the composite material pattern.

2. The method of claim 1, wherein the composite material pattern comprises a first composite material pattern region having a structural configuration comprising one or more segments with an orientation which thermally concentrates and directs heat radiated by the inner core to an area outside of the multi-mode heat transfer device.

3. The method of claim 2, wherein the composite material pattern comprises a second composite material pattern region having a structural configuration comprising one or more segments with an orientation which thermally cloaks heat radiated by the inner core.

4. The method of claim 3, wherein the composite material pattern comprises a third composite material pattern region having a structural configuration comprising one or more segments with an orientation which thermally guides heat radiated by the inner core to a specific region in the multi-mode heat transfer device.

5. The method of claim 1, wherein selectively applying the coating or the plating comprises selectively applying a mask to the one or more outer surface regions.

6. The method of claim 5, wherein selectively applying the mask comprises applying a paint of different emissivity to realize a spatially graded emissivity profile.

7. The method of claim 1, wherein selectively applying the coating or the plating comprises selectively plating the exterior surface of the thermal metamaterial composite assembly with different emissivity metal layers.

8. A method of fabricating a multi-mode heat transfer device, the method comprising:
    forming a thermal metamaterial composite structure that includes an outer core having a high thermally conductive material inlay and a low thermally conductive material matrix that form a composite material pattern to thermally concentrate and direct heat radiated by a heat source in the multi-mode heat transfer device while also thermally cloaking heat radiated by the heat source;
    stacking a plurality of thermal metamaterial composite structures in a stacked formation to form a thermal metamaterial composite assembly; and
    manipulating the emissivity of the thermal metamaterial composite assembly by selectively applying a coating or a plating to one or more outer surface regions of the outer core to enhance the transfer of heat by the composite material pattern.

9. The method of claim 8, wherein the composite material pattern comprises a first composite material pattern region having a structural configuration comprising one or more segments with an orientation which thermally concentrates and directs heat radiated by the inner core to an area outside of the multi-mode heat transfer device.

10. The method of claim 9, wherein the composite material pattern comprises a second composite material pattern region having a structural configuration comprising one or more segments with an orientation which thermally cloaks heat radiated by the inner core.

11. The method of claim 10, wherein the composite material pattern comprises a third composite material pattern region having a structural configuration comprising one or more segments with an orientation which thermally guides heat radiated by the inner core to a specific region in the multi-mode heat transfer device.

12. The method of claim 8, wherein selectively applying the coating or the plating comprises selectively applying a mask to the one or more outer surface regions.

13. The method of claim 12, wherein selectively applying the mask comprises applying a paint of different emissivity to realize a spatially graded emissivity profile.

14. The method of claim 8, wherein selectively applying the coating or the plating comprises selectively plating the exterior surface of the thermal metamaterial composite assembly with different emissivity metal layers.

15. A method of fabricating a multi-mode heat transfer device, the method comprising:
 forming a thermal metamaterial composite structure that includes an outer core having a high thermally conductive material inlay and a low thermally conductive material matrix that form a composite material pattern to thermally concentrate and direct heat radiated by a heat source in the multi-mode heat transfer device while also thermally cloaking heat radiated by the heat source; and
 stacking a plurality of thermal metamaterial composite structures in a stacked formation to form a thermal metamaterial composite assembly.

16. The method of claim 15, wherein the composite material pattern comprises a first composite material pattern region having a structural configuration comprising one or more segments with an orientation which thermally concentrates and directs heat radiated by the inner core to an area outside of the multi-mode heat transfer device.

17. The method of claim 16, wherein the composite material pattern comprises a second composite material pattern region having a structural configuration comprising one or more segments with an orientation which thermally cloaks heat radiated by the inner core.

18. The method of claim 17, wherein the composite material pattern comprises a third composite material pattern region having a structural configuration comprising one or more segments with an orientation which thermally guides heat radiated by the inner core to a specific region in the multi-mode heat transfer device.

19. The method of claim 15, further comprising, after stacking the thermal metamaterial composite structures, manipulating the emissivity of the thermal metamaterial composite assembly by selectively applying a coating or a plating to one or more outer surface regions of the outer core to enhance the transfer of heat by the composite material pattern.

20. The method of claim 8, wherein selectively applying the coating or the plating comprises selectively applying a mask to the one or more outer surface regions by applying a paint of different emissivity to realize a spatially graded emissivity profile.

* * * * *